(12) United States Patent
Fleischman et al.

(10) Patent No.: US 11,734,338 B2
(45) Date of Patent: *Aug. 22, 2023

(54) IMAGE SEARCH IN WALKTHROUGH VIDEOS

(71) Applicant: Open Space Labs, Inc., San Francisco, CA (US)

(72) Inventors: Michael Ben Fleischman, San Francisco, CA (US); Gabriel Hein, Albany, CA (US); Thomas Friel Allen, El Ceritto, CA (US); Philip DeCamp, San Francisco, CA (US)

(73) Assignee: OPEN SPACE LABS, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,792

(22) Filed: May 30, 2022

(65) Prior Publication Data
US 2022/0292135 A1 Sep. 15, 2022

Related U.S. Application Data

(63) Continuation of application No. 17/016,146, filed on Sep. 9, 2020, now Pat. No. 11,386,151.
(Continued)

(51) Int. Cl.
*G06F 16/532* (2019.01)
*G06F 16/78* (2019.01)
(Continued)

(52) U.S. Cl.
CPC .......... *G06F 16/532* (2019.01); *G06F 3/0485* (2013.01); *G06F 3/04842* (2013.01);
(Continued)

(58) Field of Classification Search
CPC .... G06F 16/532; G06F 16/783; G06F 16/738; G06F 16/7837; G06F 16/56;
(Continued)

(56) References Cited

U.S. PATENT DOCUMENTS

| 2004/0183826 A1 | 9/2004 | Taylor et al. |
| 2004/0240707 A1 | 12/2004 | Aliaga et al. |

(Continued)

FOREIGN PATENT DOCUMENTS

| JP | H11259673 A | 9/1999 |
| JP | 2001268657 A | 9/2001 |

(Continued)

OTHER PUBLICATIONS

PCT International Search Report and Written Opinion, PCT Application No. PCT/US21/26668, dated Jun. 30, 2021, 17 pages.
(Continued)

*Primary Examiner* — Marc S Somers
(74) *Attorney, Agent, or Firm* — Fenwick & West LLP

(57) ABSTRACT

A spatial indexing system receives a set of walkthrough videos of an environment taken over a period of time and receives an image search query that includes an image of an object. The spatial indexing system searches the set of walkthrough videos for instances of the object. The spatial indexing system presents search results in a user interface, displaying in a first portion a 2D map associated with one walkthrough video with marked locations of instances of the object and a second portion with a histogram of instances of the object over time in the set of walkthrough videos.

20 Claims, 18 Drawing Sheets

Related U.S. Application Data

(60) Provisional application No. 63/008,662, filed on Apr. 11, 2020.

(51) Int. Cl.

| | | |
|---|---|---|
| *G06F 16/783* | (2019.01) | |
| *G06F 16/738* | (2019.01) | |
| *G06F 16/56* | (2019.01) | |
| *G06F 3/04842* | (2022.01) | |
| *G06F 3/0485* | (2022.01) | |
| *G06F 16/732* | (2019.01) | |
| *G06V 20/40* | (2022.01) | |
| *G06V 10/20* | (2022.01) | |
| *G06F 18/22* | (2023.01) | |
| *G06F 18/40* | (2023.01) | |
| *G06V 10/94* | (2022.01) | |

(52) U.S. Cl.
CPC ............ *G06F 16/56* (2019.01); *G06F 16/738* (2019.01); *G06F 16/7328* (2019.01); *G06F 16/783* (2019.01); *G06F 16/7837* (2019.01); *G06F 16/7867* (2019.01); *G06F 18/22* (2023.01); *G06F 18/40* (2023.01); *G06V 10/255* (2022.01); *G06V 10/945* (2022.01); *G06V 20/46* (2022.01); *G06F 2203/04803* (2013.01)

(58) Field of Classification Search
CPC .... G06F 3/0485; G06F 3/04842; G06F 18/22; G06F 18/40; G06F 16/7867; G06F 16/7328; G06F 2203/04803; G06V 10/255; G06V 10/945; G06V 20/46
See application file for complete search history.

(56) References Cited

U.S. PATENT DOCUMENTS

| | | |
|---|---|---|
| 2006/0036960 A1 | 2/2006 | Loui |
| 2007/0081744 A1* | 4/2007 | Gokturk ................. G06F 16/58 |
| | | 382/176 |
| 2007/0257986 A1 | 11/2007 | Ivanov et al. |
| 2009/0031246 A1 | 1/2009 | Cowtan et al. |
| 2011/0093492 A1 | 4/2011 | Sull et al. |
| 2012/0294477 A1 | 11/2012 | Yang et al. |
| 2013/0007620 A1* | 1/2013 | Barsook ................ G06F 3/0482 |
| | | 715/719 |
| 2013/0138638 A1 | 5/2013 | Karenos et al. |
| 2017/0064374 A1 | 3/2017 | Eim et al. |
| 2017/0124399 A1* | 5/2017 | Bostick .................. G11B 27/34 |
| 2019/0005719 A1 | 1/2019 | Fleischman et al. |
| 2020/0074668 A1 | 3/2020 | Stenger et al. |

FOREIGN PATENT DOCUMENTS

| | | |
|---|---|---|
| JP | 2012141894 A | 7/2012 |
| JP | 2017215685 A | 12/2017 |

OTHER PUBLICATIONS

United States Office Action, U.S. Appl. No. 17/016,146, dated Mar. 1, 2022, 12 pages.

* cited by examiner

IMAGE SEARCH IN WALKTHROUGH VIDEOS

CROSS REFERENCE TO RELATED APPLICATIONS

This application is a continuation of U.S. application Ser. No. 17/016,146, filed Sep. 9, 2020, now U.S. Pat. No. 11,386,151, which claims the benefit of U.S. Provisional Application Ser. No. 63/008,662 filed Apr. 11, 2020, which is incorporated in its entirety herein by this reference.

TECHNICAL FIELD

This disclosure relates to image and video processing, and in particular to an image search in walkthrough videos generated from spatially indexed frames.

BACKGROUND

The ability to search for objects within a walkthrough video can power a number of high value applications in relevant fields. An image search for an object in a walkthrough video may be useful when the walkthrough video is associated with an environment. For example, the ability to search for "exit signs" in a walkthrough video of a construction site may simplify the ability to track the level of completion of construction for that site. That is, the construction site cannot be considered complete until all "exit signs" are installed. Additionally, the ability to find pallets of drywall in walkthrough videos is valuable for managing coordination between trade workers on the construction site, such that if pallets of drywall are not in particular locations at particular times, then drywall installation cannot proceed. Image search for objects in walkthrough video can have similar applications in other environments and other relevant fields.

Conventionally, a user must manually search through a walkthrough video to find instances of an object, or otherwise physically search the environment. Requiring the user to manually search for instances of an object in a walkthrough or physically search the environment is inefficient and time-consuming. A general contractor may want to keep track of quantity and location of objects of importance or value over time. A system is needed to quickly search through walkthrough videos taken at different times and identify instances of an object of interest and efficiently present results of the search.

SUMMARY

A spatial indexing system receives a walkthrough video that is a sequence of frames depicting an environment and performs a spatial indexing process to automatically identify the spatial locations at which each of the frames were captured. The frames are captured by a video capture system as the video capture system is moved through the environment along a camera path. In one embodiment, the spatial indexing system performs a simultaneous localization and mapping (SLAM) algorithm on the frames to estimate the camera path and generate a model of the environment. The camera path estimate that is generated with the SLAM algorithm can optionally be combined with motion data, location data, or a floorplan of the environment to generate a combined estimate of the camera path. The spatial indexing system can then determine the location at which each of the frames was captured and provide a visualization interface that provides an immersive view of each of the frames at its corresponding location within the model of the environment.

The automated spatial indexing process can be performed without requiring the user to manually annotate each frame or image with its location. This is particularly advantageous in situations where a large number of frames and/or images are captured at once or where frames of the same space are captured at regular time intervals (e.g., every couple of days) in order to monitor changes within the space over a period of time.

The spatial indexing system further allows a user to provide an image search query for an object or surface. The spatial indexing system searches one or more walkthrough videos to determine instances of the object or surface. The spatial indexing system receives image search query for the one or more walkthrough videos on an environment. The image search query includes an image, for example, a user-selected sub-frame from a frame of the walkthrough video. The spatial indexing system determines a set of feature vectors corresponding to the image. The spatial indexing system searches the one or more walkthrough videos to identify portions of frames in the one or more walkthrough videos that correspond to the feature vectors. The identified portions of frames correspond to instances of the object or surface associated with the image search query.

The spatial indexing system further generates an interface to display the results of the search. The interface includes a first interface portion that includes a representation of a floorplan of the environment. The first interface portion includes markers at locations within the floorplan corresponding to locations of the identified portions of frames in the walkthrough video. That is, the markers indicate locations of identified instances of the object of surface from the image search query. The interface includes a second interface portion that includes a histogram. The independent axis of the histogram corresponds to a timeline representing timestamps of the one or more walkthrough videos. In some embodiments, the bars of the histogram indicate a count of instances of identified portions within each walkthrough video on the timeline. The interface is interactive and enables the user to view the identified portions of frames by toggling the markers, or push a different walkthrough video into the first interface portion by selecting a corresponding bar in the histogram.

The search and display interface features of the spatial indexing system can be performed without the user needing to manually or physically search for objects. The search and display interface enables the user to keep track of both quantity and location of objects. This is advantageous both for determining quantity and location of objects at a certain moment in time, as well as for determining changes in quantity and locations of objects over time.

DETAILED DESCRIPTION

I. Overview

Figure 1:
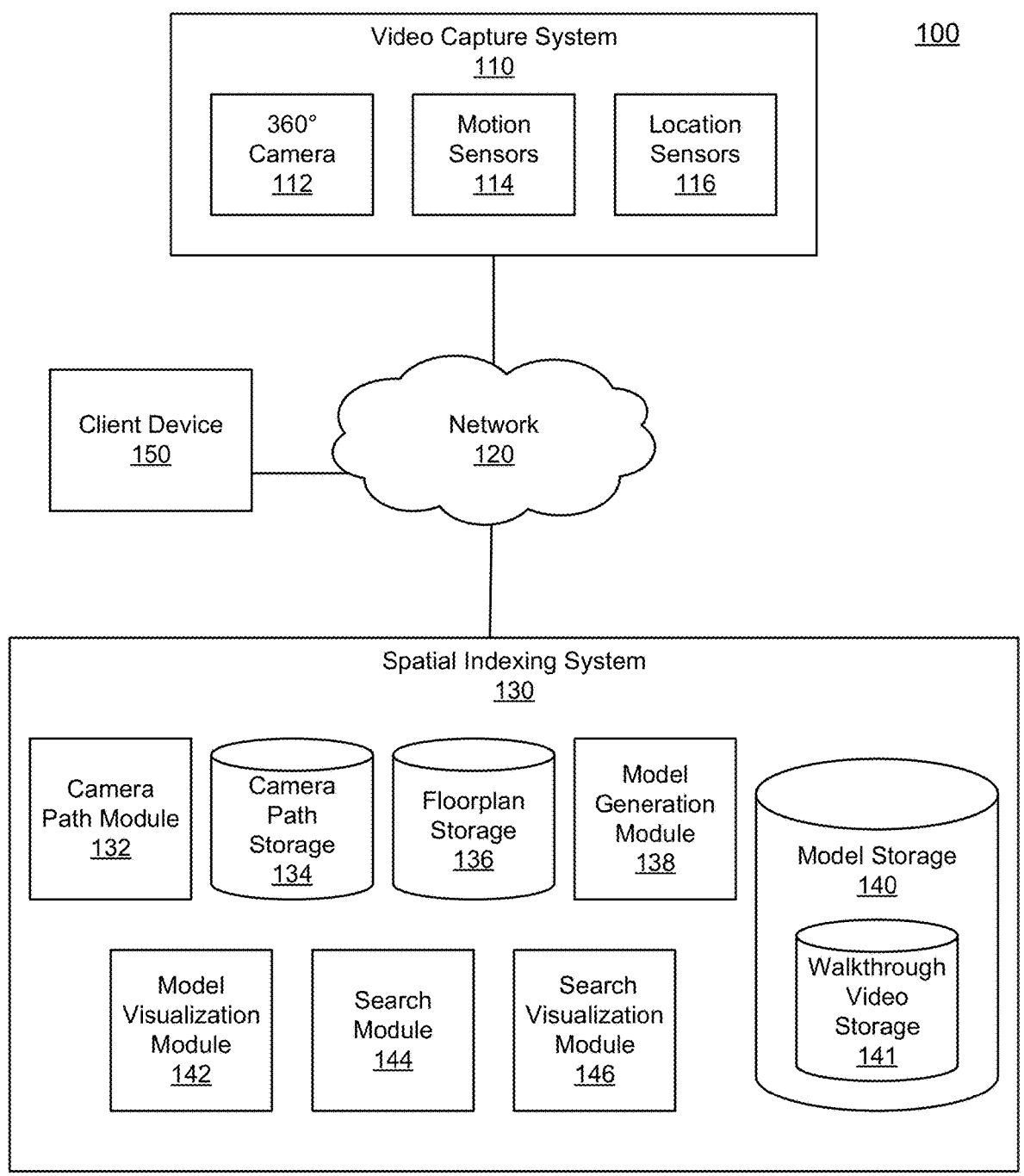
FIG. 1 illustrates a system environment for a spatial indexing system, according to one embodiment.

A spatial indexing system receives a walkthrough video that is a sequence of frames depicting an environment, such as a floor of a construction site, and performs a spatial indexing process to automatically identify the spatial locations at which each of the frames were captured. The spatial indexing system also generates an immersive model of the environment and provides a visualization interface that allows a user to view each of the frames and images at its corresponding location within the immersive model. This enables the user to quickly navigate to a specific frame and/or image by selecting the location at which the frame was recorded.

Using the methods and systems described herein, the spatial indexing system can automatically index the location of every captured frame without having a user perform any manual annotation and without having to rely solely on GPS or RF signals, which can be absent, blocked, or significantly attenuated in an indoor environment such as a construction site. This reduces the amount of user input associated with capturing the frames, which allows the process to be completed faster and more efficiently.

After indexing the location of every captured frame, the spatial indexing system can generate an immersive model of the environment. The immersive model includes a set of frames extracted from the sequence of captured frames and specifies a location on the floorplan for each of the extracted frames. The immersive model can also include one or more route vectors for each extracted frame. A route vector for an extracted frame specifies a spatial distance (i.e., a direction and a magnitude) between the extracted frame and one of the other extracted frames. When displaying one of the extracted frames in the visualization interface, the spatial indexing system can display waypoint icons within the extracted frame at the positions defined by each of the route vectors. The user can then select one of these waypoint icons to view the extracted frame that was captured at that position.

When interacting with the immersive model, the user can provide an image search query to the spatial indexing system to search for an object. The spatial indexing system searches the walkthrough video associated with the immersive model to determine instances of the object within the walkthrough video. In another embodiment, the spatial indexing system searches multiple walkthrough videos of the environment taken at different points in time to determine instances of the object. The spatial indexing system provides the results of the search for display to the user. The display of results enables the user to keep track of both quantity and location of objects, and how both change over time.

The spatial indexing system searches for the object based on the image search query in walkthrough videos, according to some embodiments. The spatial indexing system segments the walkthrough videos into sub-frames by performing overlapping image crops. The spatial indexing system generates feature vectors corresponding to each sub-frame as well as the image of the object in the image search query. The spatial indexing system determines instances of the object throughout the walkthrough videos by comparing the similarity between feature vectors corresponding to different sub-frames and the feature vector corresponding to the image search query, thereby identifying portions of frames that are similar to the object. For example, the feature vectors corresponding to each sub-frame are indexed into a searchable index and the searchable index is queried for nearest neighbors to the feature vector corresponding to the image search query. In some embodiments, a de-duplication is performed on the nearest neighbors such that the returned identified portions each correspond to different instances of the object.

The object search may include a refinement step. The identified portions are provided to the user who provides feedback by up-vote or down-vote on displayed sub-frame corresponding to the identified portions. The feedback is used to refine the feature vector associated with the image search query. The object search is run again using the refined feature vector. In the second run of the object search, additional walkthrough videos may be provided for search.

The spatial indexing system provides the resulting identified portions of frames of walkthrough videos for view to the user in a two-portion interface. The first portion of the interface includes a two-dimensional view of a floorplan and the results for a first walkthrough video. The floorplan includes markers indicating the location of each identified instance of the object, corresponding to the location at which a frame associated with an identified portion of the frame was captured. The user can toggle each marker to view the identified portion. The second portion of the interface includes a histogram that presents results for the full set of walkthrough videos that have been searched. The independent axis of the histogram represents a timeline, and bars along the histogram correspond to dates at which each respective walkthrough video was captured. A highlighted portion of each bar of the histogram indicates a number of identified portions of frames in the respective walkthrough video (e.g., portions of frames that include the object). The user can toggle between the bars of the histogram to generate the floorplan and results of the respective walkthrough video in the first interface portion.

The two-portion interface provides an efficient means to view the results of the object search. The first portion provides detailed results of a walkthrough video captured at a particular date, in which the user can view all instances of the object and their respective locations. The second portion provides a summary of how the number of instances of the object changes over time. The user can interact with the two-portion interface to view different results in detail and collect valuable data.

Although the drawings and written description provide examples with respect to a construction site, the methods and systems described herein can also be used to in other types of environments, such as an interior area of a completed building, an interior area of some other type of structure (such as a ship), or an outdoor area (such as a garden or yard). In addition to the construction site example described herein, the captured frames and the resulting immersive model can also be used in a variety of other contexts. For instance, a security guard can use the methods and systems described herein to record the state of a facility at each checkpoint along a route. As another example, a facilities manager can capture photo documentation of the inventory in a warehouse. As still another example, a realtor can capture photos to create a virtual tour of a house.

II. System Environment

FIG. 1 illustrates a system environment 100 for identifying spatial locations at which frames in a sequence were captured, according to one embodiment. In the embodiment shown in FIG. 1, the system environment 100 includes a video capture system 110, a network 120, a spatial indexing system 130, and a client device 150. Although a single video capture system 110 and a single client device 150 is shown in FIG. 1, in some implementations the spatial indexing system interacts with multiple video capture systems 110 and multiple client devices 150.

The video capture system 110 collects one or more of frame data, motion data, and location data as the system 110 is moved along a camera path. In the embodiment shown in FIG. 1, the video capture system includes a 360-degree camera 112, motion sensors 114, and location sensors 116. The video capture system 110 is implemented as a device with a form factor that is suitable for being moved along the camera path. In one embodiment, the video capture system 110 is a portable device that a user physically moves along the camera path, such as a wheeled cart or a device that is mounted on or integrated into an object that is worn on the user's body (e.g., a backpack or hardhat). In another embodiment, the video capture system 110 is mounted on or integrated into a vehicle. The vehicle may be, for example, a wheeled vehicle (e.g., a wheeled robot) or an aircraft (e.g., a quadcopter drone), and can be configured to autonomously travel along a preconfigured route or be controlled by a human user in real-time.

The 360-degree camera 112 collects frame data by capturing a sequence of 360-degree frames as the video capture system 110 is moved along the camera path. As referred to herein, a 360-degree frame is a frame having a field of view that covers a 360-degree field of view. The 360-degree camera 112 can be implemented by arranging multiple 360-degree cameras in the video capture system 110 so that they are pointed at varying angles relative to each other, and configuring the 360-degree cameras to capture frames of the environment from their respective angles at approximately the same time. The frames can then be combined to form a single 360-degree frame. For example, the 360-degree camera 112 can be implemented by capturing frames at substantially the same time from two 180° panoramic cameras that are pointed in opposite directions.

The frame data captured by the video capture system 110 may further include frame timestamps. The frame timestamps are data corresponding to the time at which each frame was captured by the video capture system 110. As used herein, frames are captured at substantially the same time if they are captured within a threshold time interval of each other (e.g., within 1 second, within 100 milliseconds, etc.).

In one embodiment, the 360-degree camera 112 captures a 360-degree video, and the frames in 360-degree video are the frames of the walkthrough video. In another embodiment, the 360-degree camera 112 captures a sequence of still frames separated by fixed time intervals. The walkthrough video that is a sequence of frames can be captured at any frame rate, such as a high frame rate (e.g., 60 frames per second) or a low frame rate (e.g., 1 frame per second). In general, capturing the walkthrough video that is a sequence of frames at a higher frame rate produces more robust results, while capturing the walkthrough video that is a sequence of frames at a lower frame rate allows for reduced data storage and transmission. The motion sensors 114 and location sensors 116 collect motion data and location data, respectively, while the 360-degree camera 112 is capturing the frame data. The motion sensors 114 can include, for example, an accelerometer and a gyroscope. The motion sensors 114 can also include a magnetometer that measures a direction of a magnetic field surrounding the video capture system 110.

The location sensors 116 can include a receiver for a global navigation satellite system (e.g., a GPS receiver) that determines the latitude and longitude coordinates of the video capture system 110. In some embodiments, the location sensors 116 additionally or alternatively include a receiver for an indoor positioning system (IPS) that determines the position of the video capture system based on signals received from transmitters placed at known locations in the environment. For example, multiple radio frequency (RF) transmitters that transmit RF fingerprints are placed throughout the environment, and the location sensors 116 also include a receiver that detects RF fingerprints and estimates the location of the video capture system 110 within the environment based on the relative intensities of the RF fingerprints.

Although the video capture system 110 shown in FIG. 1 includes a 360-degree camera 112, motion sensors 114, and location sensors 116, some of the components 112, 114, 116 may be omitted from the video capture system 110 in other embodiments. For instance, one or both of the motion sensors 114 and the location sensors 116 may be omitted from the video capture system. In addition, although the video capture system 110 is described in FIG. 1 with a 360-degree camera 112, the video capture system 110 may alternatively include a camera with a narrow field of view.

In some embodiments, the video capture system 110 is implemented as part of a computing device (e.g., the computer system 900 shown in FIG. 9) that also includes a storage device to store the captured data and a communication interface that sends the captured data over the network 120 to the spatial indexing system 130. In one embodiment, the video capture system 110 stores the captured data locally as the system 110 is moved along the camera path, and the data is sent to the spatial indexing system 130 after the data collection has been completed. In another embodiment, the video capture system 110 sends the captured data to the spatial indexing system 130 in real-time as the system 110 is being moved along the camera path.

The video capture system 110 communicates with other systems over the network 120. The network 120 may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). The network 120 may also be used to deliver push notifications through various push notification services, such as APPLE Push Notification Service (APNs) and GOOGLE Cloud Messaging (GCM). Data exchanged over the network 110 may be represented using any suitable format, such as hypertext markup language (HTML), extensible markup language (XML), or JavaScript object notation (JSON). In some embodiments, all or some of the communication links of the network 120 may be encrypted using any suitable technique or techniques.

The spatial indexing system 130 receives the frames and the other data collected by the video capture system 110, performs a spatial indexing process to automatically identify the spatial locations at which each of the frames and images were captured, builds a model of the environment, provides a visualization interface that allows the client device 150 to view the captured frames and images at their respective locations within the model, enables a user to search for instances of an object in the environment, and provides a search visualization interface that allows the client device 150 to view the results of the object search. In the embodiment shown in FIG. 1, the spatial indexing system 130 includes, a camera path module 132, camera path storage 134, floorplan storage 136, a model generation module 138, model storage 140, a model visualization module 142, a search module 144, and a search visualization module 146.

The camera path module 132 receives the frames in the walkthrough video and the other data that were collected by the video capture system 110 as the system 110 was moved along the camera path and determines the camera path based on the received frames and data. In one embodiment, the camera path is defined as a 6D camera pose for each frame in the walkthrough video that is a sequence of frames. The 6D camera pose for each frame is an estimate of the relative position and orientation of the 360-degree camera 112 when the frame was captured. The camera path module 132 can store the camera path in the camera path storage 134.

In one embodiment, the camera path module 132 uses a SLAM (simultaneous localization and mapping) algorithm to simultaneously (1) determine an estimate of the camera path by inferring the location and orientation of the 360-degree camera 112 and (2) model the environment using direct methods or using landmark features (such as oriented FAST and rotated BRIEF (ORB), scale-invariant feature transform (SIFT), speeded up robust features (SURF), etc.) extracted from the walkthrough video that is a sequence of frames. The camera path module 132 outputs a vector of six dimensional (6D) camera poses over time, with one 6D vector (three dimensions for location, three dimensions for orientation) for each frame in the sequence, and the 6D vector can be stored in the camera path storage 134. An embodiment of the camera path module 132 is described in detail below with respect to FIG. 2A.

The spatial indexing system 130 can also include floorplan storage 136, which stores one or more floorplans, such as those of environments captured by the video capture system 110. As referred to herein, a floorplan is a to-scale, two-dimensional (2D) diagrammatic representation of an environment (e.g., a portion of a building or structure) from a top-down perspective. The floorplan specifies the positions and dimensions of physical features in the environment, such as doors, windows, walls, and stairs. The different portions of a building or structure may be represented by separate floorplans. For example, in the construction example described above, the spatial indexing system 130 may store separate floorplans for each floor, unit, or substructure.

The model generation module 136 generates an immersive model of the environment. As referred to herein, the immersive model is a representation of the environment that comprises a set of extracted frames of the environment, the relative positions of each of the frames (as indicated by the frame's 6D pose), and (optionally) the absolute position of each of the frames on a floorplan of the environment. In one embodiment, the model generation module 136 receives a frame sequence and its corresponding camera path (e.g., a 6D pose vector specifying a 6D pose for each frame in the walkthrough video that is a sequence of frames) from the camera path module 132 or the camera path storage 134 and extracts a subset of the frames in the sequence and their corresponding 6D poses for inclusion in the model. For example, if the walkthrough video that is a sequence of frames are frames in a video that was captured at 30 frames per second, the model generation module 136 subsamples the frames by extracting frames and their corresponding 6D poses at 0.5-second intervals. An embodiment of the model generation module 136 is described in detail below with respect to FIG. 2B.

After generating the model, the model generation module 136 can store the model in the model storage 140. The model storage 140 includes a walkthrough video storage 141. The set of frames of the environment associated with the model are stored as a walkthrough video within the walkthrough video storage 141. The walkthrough video stored in the walkthrough video storage 141 may correspond to the set of frames received from the video capture system 110 or be some subset of frames thereof as extracted by the model generation module 138 for generation of the model. Each model and associated walkthrough video stored in the model storage 140 is associated with a timestamp. The timestamp indicates the date and/or time at which the video capture system 110 captures the set of frames in the walkthrough video.

Figure 3A:
FIGS. 3A-3G are screenshots illustrating portions of an immersive model provided by a model visualization module and search visualization interfaces provided by a search visualization module, according to one embodiment.
Figure 3B:
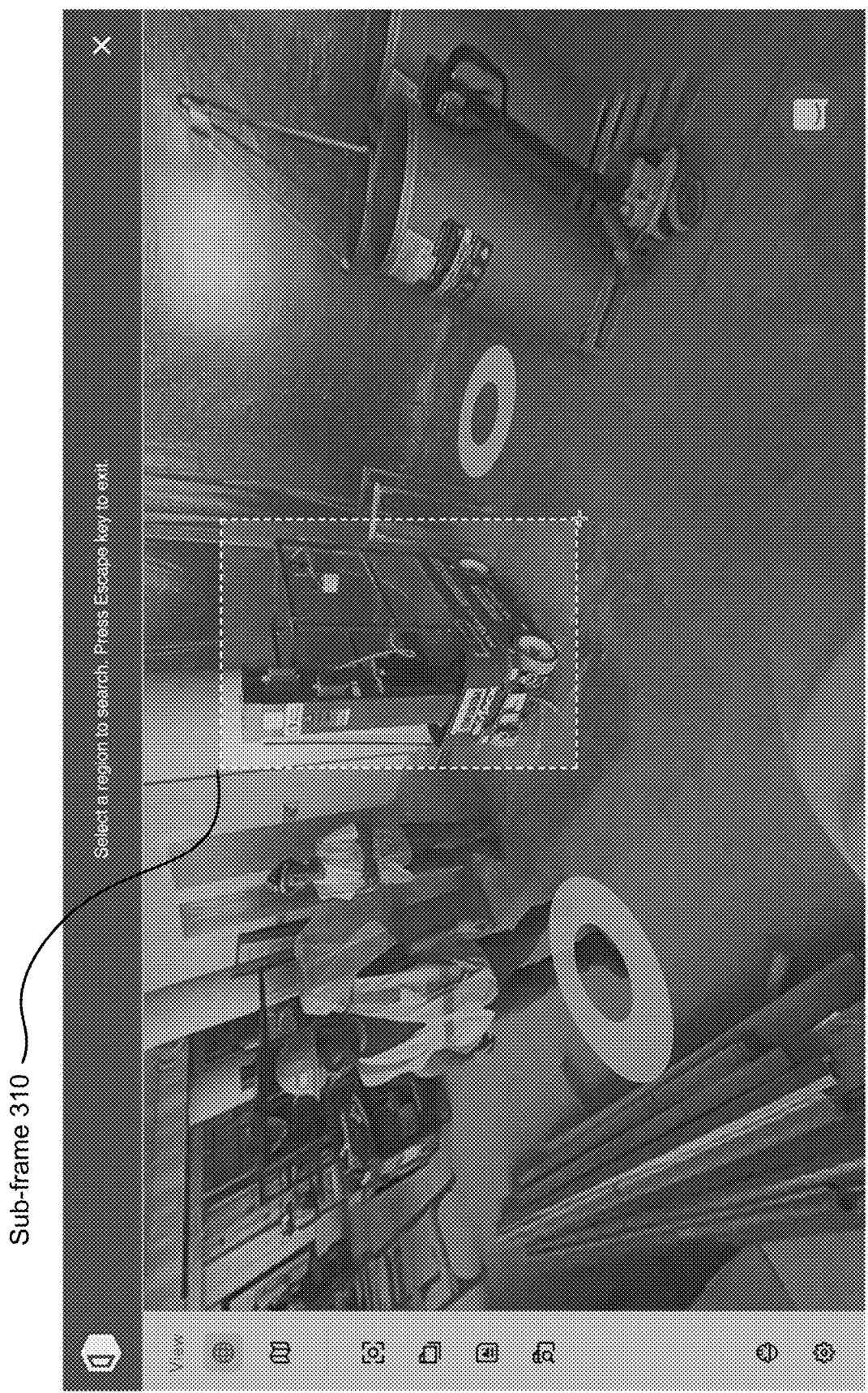

The model visualization module 142 provides a visualization interface to the client device 150. The visualization interface allows the user to view the immersive model in two ways. First, the visualization interface provides a 2D overhead map interface based on the output of the model generation module 138 as associated with the corresponding floorplan of the environment from the floorplan storage 136. The 2D overhead map is an interactive interface in which each relative camera location indicated on the 2D map is interactive, such that clicking on a point on the map navigates to the extracted frame that was captured at that point in space. Second, the visualization interface provides a first-person view of an extracted 360-degree frame that allows the user to pan and zoom around the frame and to navigate to other frames by selecting waypoint icons within the frame that represent the relative locations of the other frames. The visualization interface provides the first-person view of a frame after the user selects the frame in the 2D overhead map or in the first-person view of a different frame. In some embodiments, the model visualization module 142 provides for display in the visualization interface an option for a user to input an image search query. In some embodiments, the user can provide an image search query while navigating in the 2D overhead map interactive interface or while navigating in the first-person view of the extracted 360-degree frames of the walkthrough video. The image search query prompts the search module 144. Example screenshots of the visualization interface are shown in FIGS. 3A-3B.

The search module 144 searches one or more walkthrough videos of an environment responsive to an image search query to determine portions of frames that correspond to the image search query. The image search query specifies an image of an object or surface for the search module 144 to search for in the one or more walkthrough videos. The one or more walkthrough videos are accessed in the walkthrough video storage 141 and are associated with a respective model in the model storage 140. The environment is associated with a floorplan in the floorplan storage 136. The search module 144 performs one or more techniques to identify portions of frames in the one or more walkthrough videos that correspond to the image search query. In some embodiments, after an initial search of one or more walkthroughs, a user provides feedback to the search module 144 on the identified portion to refine the image search query, or the image search query is refined using other techniques (for instance, based on an automated evaluation of the most predictive features of an image search query). In some embodiments, the search module 144 searches additional walkthrough videos to identify additional portions of frames in the additional walkthrough videos corresponding to the refined image search query. The search module 144 provides the results of the search including the identified portions and, if applicable, additional identified portions to the search visualization module 146. An embodiment of the search module 144 is described in detail below with respect to FIG. 2C.

Figure 3C:
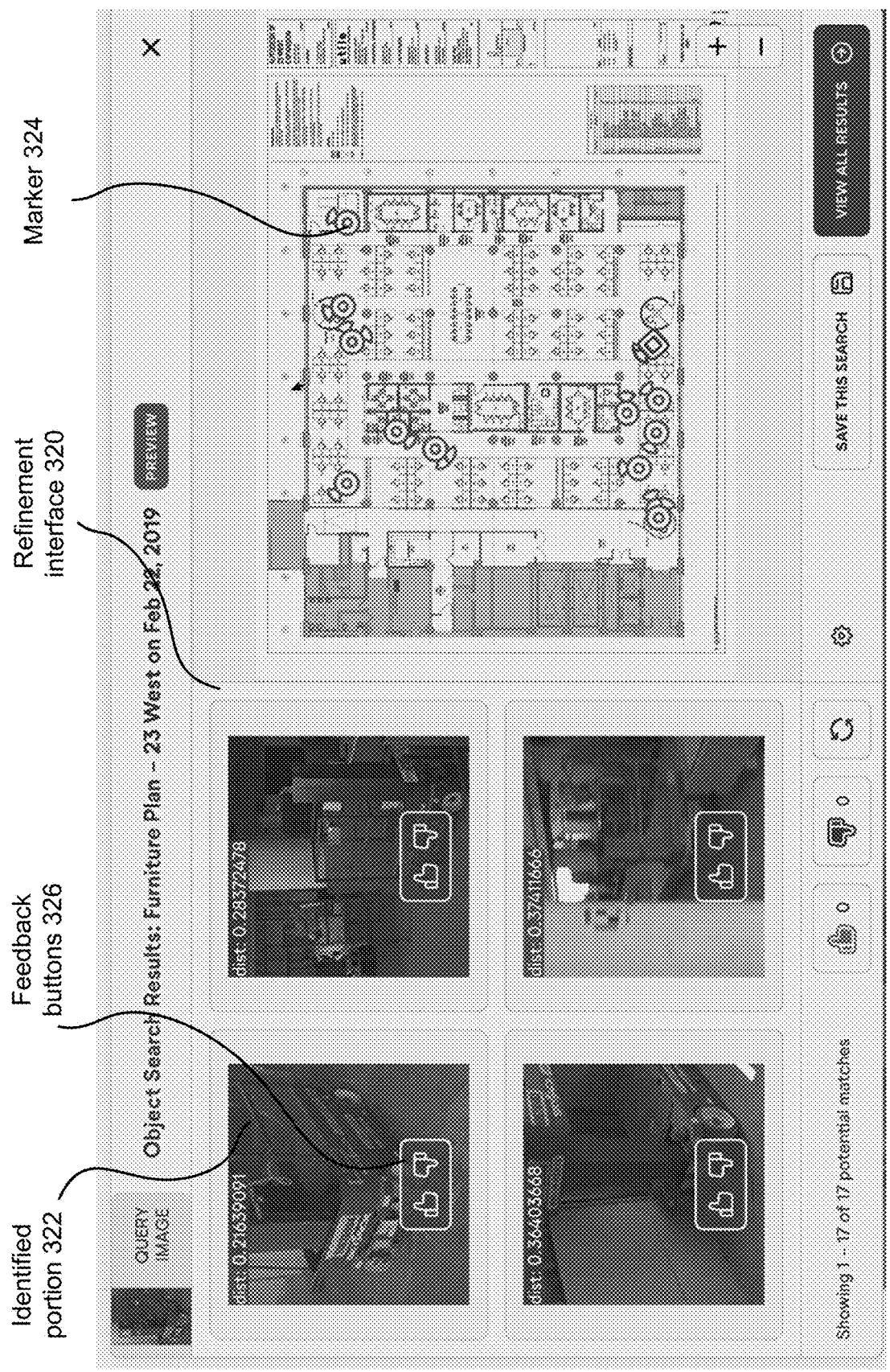

The search visualization module 146 provides a search visualization interface to the client device 150. The search visualization interface allows the user to view the results of the image search query. In some embodiments, the search visualization interface includes a refinement interface. The refinement interface enables a user to provide feedback on the results of the search to refine the image search query. For example, the refinement interface enables the user to input an indication to confirm that the identified portion is an instance of the object in the image search query, or select an indication to reject the identified portion for not being an instance of the object in the image search query. An example of the search visualization interface including the refinement interface is shown in FIG. 3C.

In some embodiments, the search visualization interface includes two portions. A first portion of the search visualization interface indicates the search results for a first walkthrough video of the one or more walkthrough videos. The first interface portion includes a representation of a floorplan of the environment associated with the image search query. In some embodiments, the representation of the floorplan is a 2D overhead map interface based on the output of the model generation module 138. In some embodiments, the first portion includes a highlighted or otherwise marked indication of the camera path associated with the first walkthrough video within the representation of the floorplan. The first portion further includes highlighted or otherwise marked indications of locations within the representation of the floorplan corresponding to the identified portions of frames of a walkthrough video. A second portion of the search visualization interface includes a histogram of results of the one or more walkthrough videos. The independent axis of the histogram is a timeline corresponding to timestamps of the one or more walkthrough videos. In some embodiments, the histogram includes highlighted bars indicating instances of the identified portions of frames within the one or more walkthrough videos captured over a period of time (such as a number of days, weeks, months, or longer). Example screenshots of the two-portion search visualization interface are shown in FIGS. 3D-3G.

The search visualization interface is an interactive interface. For example, each highlight or marker indicating an identified portion in the first portion is interactive, such that clicking on the highlight or marker navigates to the identified portion of the frame that was captured at that point in space. In some embodiments, the search visualization interface provides a first-person view of the 360-degree frame that allows the user to view the identified portion. The user can confirm whether the identified portion is an instance of the object in the image search query. The search visualization interface provides an efficient means for determining quantity and location of objects at a certain moment in time, as well as for monitoring changes in quantity and/or locations of objects over time through the histogram in the second portion. Example screenshots of the visualization interface are shown in FIGS. 3C-3G.

The client device 150 is any computing device such as a smartphone, tablet computer, laptop computer that can connect to the network 120. The client device 150 displays, on a display device such as a screen, the interface to a user and receives user inputs to interact with the interface. An example implementation of the client device is described below with reference to the computer system 900 in FIG. 9.

IV. Camera Path Generation Overview

Figure 2A:
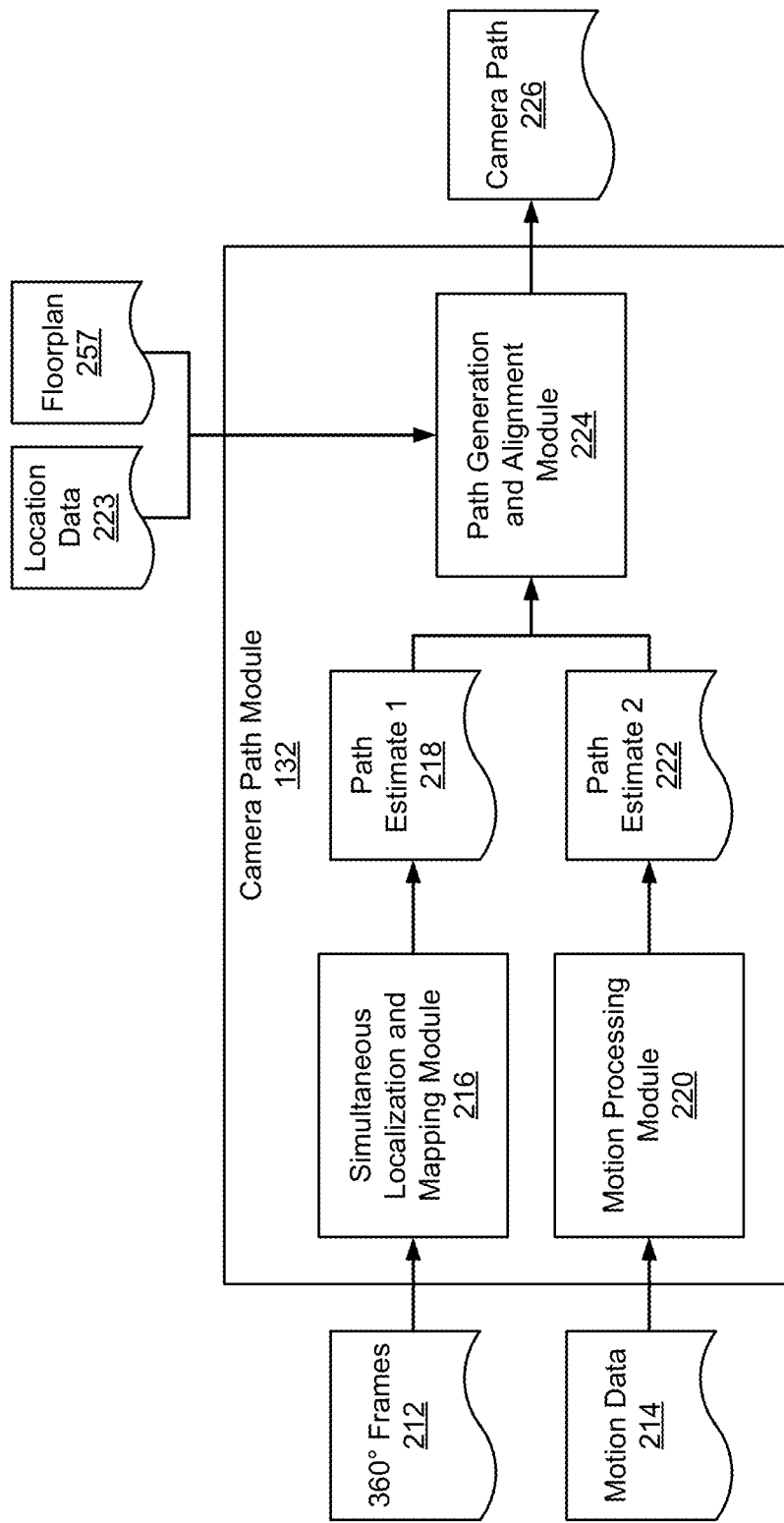
FIG. 2A illustrates a block diagram of a camera path module, according to one embodiment.

FIG. 2A illustrates a block diagram of the camera path module 132 of the spatial indexing system 130 shown in FIG. 1, according to one embodiment. The camera path module 132 receives input data (e.g., a sequence of 360-degree frames 212, motion data 214, and location data 223) captured by the video capture system 110 and generates a camera path 226. In the embodiment shown in FIG. 2A, the camera path module 132 includes a simultaneous localization and mapping (SLAM) module 216, a motion processing module 220, and a path generation and alignment module 224.

The SLAM module 216 receives the sequence of 360-degree frames 212 and performs a SLAM algorithm to generate a first estimate 218 of the camera path. Before performing the SLAM algorithm, the SLAM module 216 can perform one or more preprocessing steps on the frames 212. In one embodiment, the pre-processing steps include extracting features from the frames 212 by converting the sequence of 360-degree frames 212 into a sequence of vectors, where each vector is a feature representation of a respective frame. In particular, the SLAM module can extract SIFT features, SURF features, or ORB features.

After extracting the features, the pre-processing steps can also include a segmentation process. The segmentation process divides the walkthrough video that is a sequence of frames into segments based on the quality of the features in each of the frames. In one embodiment, the feature quality in a frame is defined as the number of features that were extracted from the frame. In this embodiment, the segmentation step classifies each frame as having high feature quality or low feature quality based on whether the feature quality of the frame is above or below a threshold value, respectively (i.e., frames having a feature quality above the threshold are classified as high quality, and frames having a feature quality below the threshold are classified as low quality). Low feature quality can be caused by, e.g., excess motion blur or low lighting conditions.

After classifying the frames, the segmentation process splits the sequence so that consecutive frames with high feature quality are joined into segments and frames with low feature quality are not included in any of the segments. For example, suppose the camera path travels into and out of a series of well-lit rooms along a poorly-lit hallway. In this example, the frames captured in each room are likely to have high feature quality, while the frames captured in the hallway are likely to have low feature quality. As a result, the segmentation process divides the walkthrough video that is a sequence of frames so that each sequence of consecutive frames captured in the same room is split into a single segment (resulting in a separate segment for each room), while the frames captured in the hallway are not included in any of the segments.

After the pre-processing steps, the SLAM module 216 performs a SLAM algorithm to generate a first estimate 218 of the camera path. In one embodiment, the first estimate 218 is also a vector of 6D camera poses over time, with one 6D vector for each frame in the sequence. In an embodiment where the pre-processing steps include segmenting the walkthrough video that is a sequence of frames, the SLAM algorithm is performed separately on each of the segments to generate a camera path segment for each segment of frames.

The motion processing module 220 receives the motion data 214 that was collected as the video capture system 110 was moved along the camera path and generates a second estimate 222 of the camera path. Similar to the first estimate 218 of the camera path, the second estimate 222 can also be represented as a 6D vector of camera poses over time. In one embodiment, the motion data 214 includes acceleration and gyroscope data collected by an accelerometer and gyroscope, respectively, and the motion processing module 220 generates the second estimate 222 by performing a dead reckoning process on the motion data. In an embodiment where the motion data 214 also includes data from a magnetometer, the magnetometer data may be used in addition to or in place of the gyroscope data to determine changes to the orientation of the video capture system 110.

The data generated by many consumer-grade gyroscopes includes a time-varying bias (also referred to as drift) that can impact the accuracy of the second estimate 222 of the camera path if the bias is not corrected. In an embodiment where the motion data 214 includes all three types of data described above (accelerometer, gyroscope, and magnetometer data), and the motion processing module 220 can use the accelerometer and magnetometer data to detect and correct for this bias in the gyroscope data. In particular, the motion processing module 220 determines the direction of the gravity vector from the accelerometer data (which will typically point in the direction of gravity) and uses the gravity vector to estimate two dimensions of tilt of the video capture system 110. Meanwhile, the magnetometer data is used to estimate the heading bias of the gyroscope. Because magnetometer data can be noisy, particularly when used inside a building whose internal structure includes steel beams, the motion processing module 220 can compute and use a rolling average of the magnetometer data to estimate the heading bias. In various embodiments, the rolling average may be computed over a time window of 1 minute, 5 minutes, 10 minutes, or some other period.

The path generation and alignment module 224 combines the first estimate 218 and the second estimate 222 of the camera path into a combined estimate of the camera path 226. In an embodiment where the video capture system 110 also collects location data 223 while being moved along the camera path, the path generation module 224 can also use the location data 223 when generating the camera path 226. If a floorplan of the environment is available, the path generation and alignment module 224 can also receive the floorplan 257 as input and align the combined estimate of the camera path 216 to the floorplan 257. Example techniques for combining the first estimate 218 and the second estimate 222 and aligning the camera path to a floorplan are described below with respect to FIGS. 4, 5, and 6.

V. Model Generation Overview

Figure 2B:
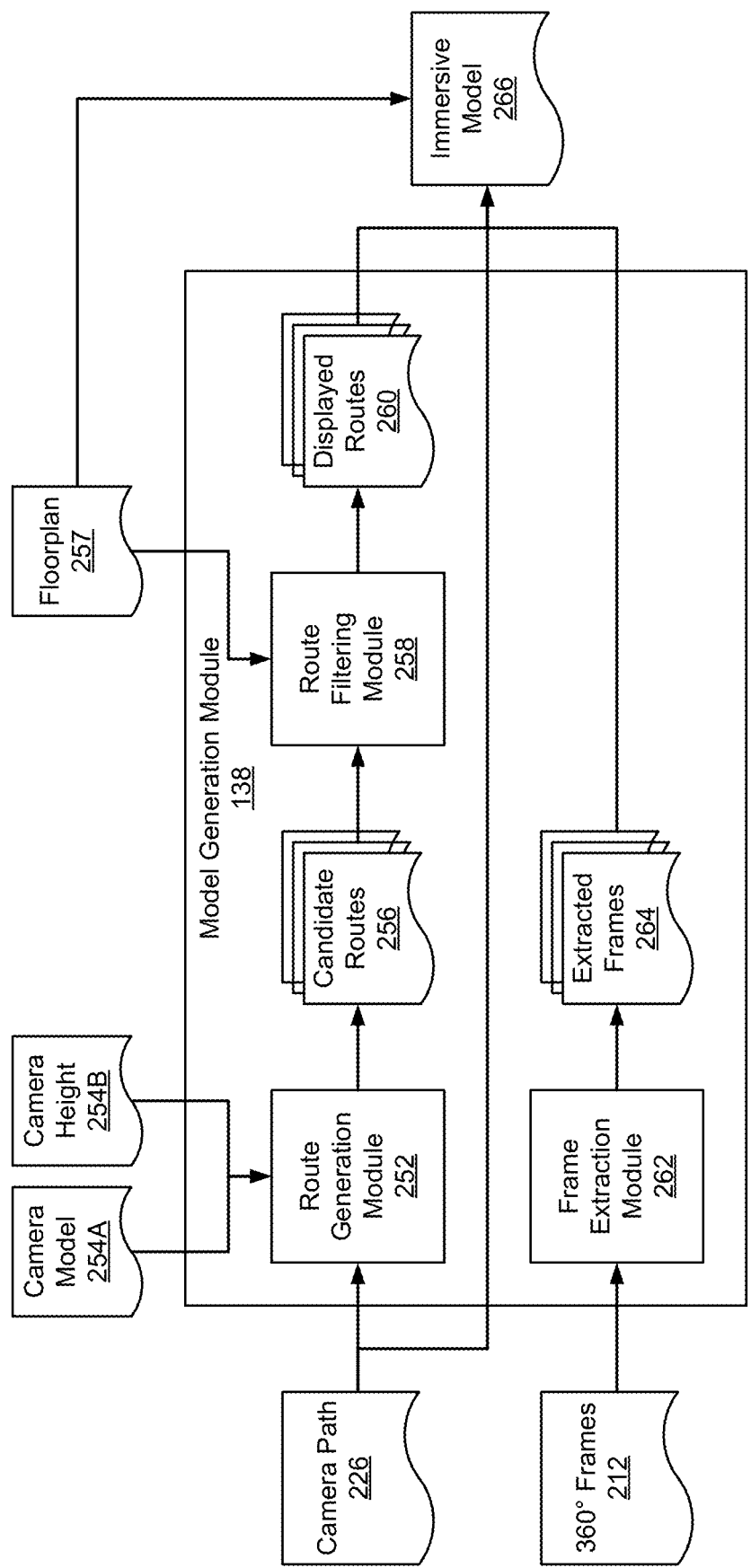
FIG. 2B illustrates a block diagram of a model generation module, according to one embodiment.

FIG. 2B illustrates a block diagram of the model generation module 138 of the spatial indexing system 130 shown in FIG. 1, according to one embodiment. The model generation module 138 receives the camera path 226 generated by the camera path module 132, along with the sequence of 360-degree frames 212 that were captured by the video capture system 110, a floorplan 257 of the environment, and information about the 360-degree camera 254. The output of the model generation module 138 is an immersive model 266 of the environment. In the illustrated embodiment, the model generation module 138 includes a route generation module 252, a route filtering module 258, and a frame extraction module 262.

The route generation module 252 receives the camera path 226 and 360-degree camera information 254 and generates one or more candidate route vectors 256 for each extracted frame. The 360-degree camera information 254 includes a camera model 254A and camera height 254B. The camera model 254A is a model that maps each 2D point in a 360-degree frame (i.e., as defined by a pair of coordinates identifying a pixel within the frame) to a 3D ray that represents the direction of the line of sight from the 360-degree camera to that 2D point. In one embodiment, the spatial indexing system 130 stores a separate camera model for each type of camera supported by the system 130. The camera height 254B is the height of the 360-degree camera relative to the floor of the environment while the walkthrough video that is a sequence of frames is being captured. In one embodiment, the 360-degree camera height is assumed to have a constant value during the frame capture process. For instance, if the 360-degree camera is mounted on a hardhat that is worn on a user's body, then the height has a constant value equal to the sum of the user's height and the height of the 360-degree camera relative to the top of the user's head (both quantities can be received as user input).

As referred to herein, a route vector for an extracted frame is a vector representing a spatial distance between the extracted frame and one of the other extracted frames. For instance, the route vector associated with an extracted frame has its tail at that extracted frame and its head at the other extracted frame, such that adding the route vector to the spatial location of its associated frame yields the spatial location of the other extracted frame. In one embodiment, the route vector is computed by performing vector subtraction to calculate a difference between the three-dimensional locations of the two extracted frames, as indicated by their respective 6D pose vectors.

Referring to the model visualization module 142, the route vectors for an extracted frame are later used after the model visualization module 142 receives the immersive model 266 and displays a first-person view of the extracted frame. When displaying the first-person view, the model visualization module 142 renders a waypoint icon (shown in FIG. 3B as a blue circle) at a position in the frame that represents the position of the other frame (e.g., the frame at the head of the route vector). In one embodiment, the model visualization module 140 uses the following equation to determine the position within the frame at which to render the waypoint icon corresponding to a route vector:

$$P_{icon} = M_{proj} * (M_{view})^{-1} * M_{delta} * G_{ring}.$$

In this equation, $M_{proj}$ is a projection matrix containing the parameters of the 360-degree camera projection function used for rendering, $M_{view}$ is an isometry matrix representing the user's position and orientation relative to his or her current frame, $M_{delta}$ is the route vector, $G_{ring}$ is the geometry (a list of 3D coordinates) representing a mesh model of the waypoint icon being rendered, and $P_{icon}$ is the geometry of the icon within the first-person view of the frame.

Referring again to the route generation module 138, the route generation module 252 can compute a candidate route vector 256 between each pair of extracted frames. However, displaying a separate waypoint icon for each candidate route vector associated with an frame can result in a large number of waypoint icons (e.g., several dozen) being displayed in an frame, which can overwhelm the user and make it difficult to discern between individual waypoint icons.

To avoid displaying too many waypoint icons, the route filtering module 258 receives the candidate route vectors 256 and selects a subset of the route vectors to be displayed route vectors 260 that are represented in the first-person view with corresponding waypoint icons. The route filtering module 256 can select the displayed route vectors 256 based on a variety of criteria. For example, the candidate route vectors 256 can be filtered based on distance (e.g., only route vectors having a length less than a threshold length are selected).

In some embodiments, the route filtering module 256 also receives a floorplan 257 of the environment and also filters the candidate route vectors 256 based on features in the floorplan. In one embodiment, the route filtering module 256 uses the features in the floorplan to remove any candidate route vectors 256 that pass through a wall, which results in a set of displayed route vectors 260 that only point to positions that are visible in the frame. This can be done, for example, by extracting an frame patch of the floorplan from the region of the floorplan surrounding a candidate route vector 256, and submitting the frame patch to an frame classifier (e.g., a feed-forward, deep convolutional neural network) to determine whether a wall is present within the patch. If a wall is present within the patch, then the candidate route vector 256 passes through a wall and is not selected as one of the displayed route vectors 260. If a wall is not present, then the candidate route vector does not pass through a wall and may be selected as one of the displayed route vectors 260 subject to any other selection criteria (such as distance) that the module 258 accounts for.

The frame extraction module 262 receives the sequence of 360-degree frames and extracts some or all of the frames to generate extracted frames 264. In one embodiment, the sequences of 360-degree frames are captured as frames of a 360-degree walkthrough video, and the frame extraction module 262 generates a separate extracted frame of each frame. As described above with respect to FIG. 1, the frame extraction module 262 can also extract a subset of the walkthrough video that is a sequence of 360-degree frames 212. For example, if the walkthrough video that is a sequence of 360-degree frames 212 was captured at a relatively high framerate (e.g., 30 or 60 frames per second), the frame extraction module 262 can extract a subset of the frames at regular intervals (e.g., two frames per second of video) so that a more manageable number of extracted frames 264 are displayed to the user as part of the immersive model.

The floorplan 257, displayed route vectors 260, camera path 226, and extracted frames 264 are combined into the immersive model 266. As noted above, the immersive model 266 is a representation of the environment that comprises a set of extracted frames 264 of the environment, the relative positions of each of the frames (as indicated by the 6D poses in the camera path 226). In the embodiment shown in FIG. 2B, the immersive model also includes the floorplan 257, the absolute positions of each of the frames on the floorplan, and displayed route vectors 260 for some or all of the extracted frames 264.

VI. Search Module Overview

Figure 2C:
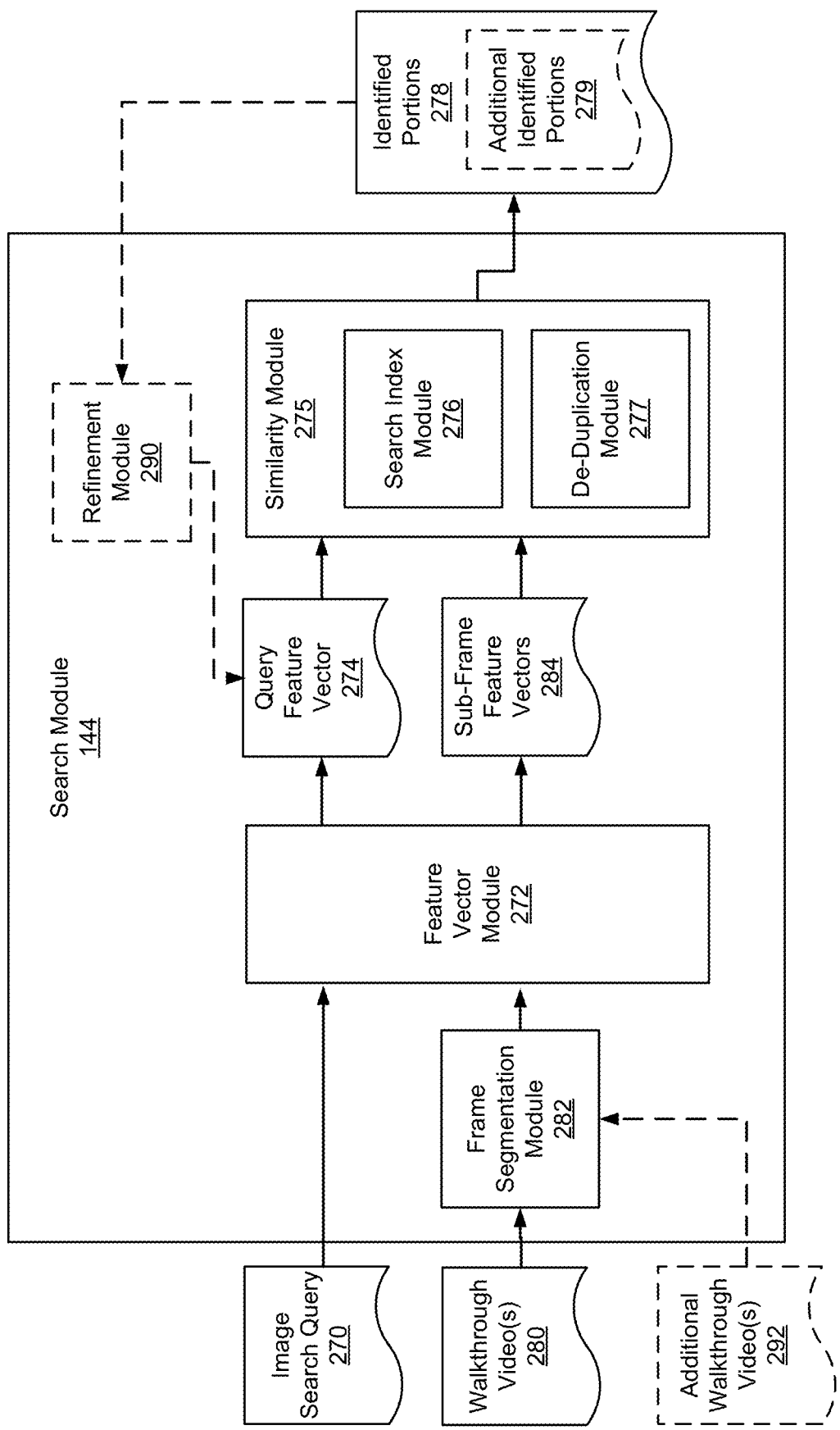
FIG. 2C illustrates a block diagram of a search module, according to one embodiment.

FIG. 2C illustrates a block diagram of the search module 144 shown in FIG. 1, according to one embodiment. The search module 144 receives an image search query 270 that includes at least one of an object or a surface to search for and one or more walkthrough videos 280 and returns identified portions 278 of the walkthrough videos 280 that correspond to instances of the object or surface in the image search query 270. In the embodiment shown in FIG. 2A, the search module 144 includes a frame segmentation module 282, a feature vector module 272, and a similarity module 275. In an optional embodiment, the search module also includes a refinement module 290 and/or receives additional walkthrough videos 292.

The image search query 270 is a search request that includes at least one object or surface for the search module 144 to search for in one or more walkthrough videos 280. In some embodiments, the image search query includes an image. The image may be a novel image, such as a cell phone image, or a stored image associated with an object or surface, such as a stock photo. The image can alternatively be a sub-frame selected from a 360-degree frame in a first walkthrough video. For example, while a user is viewing an immersive model associated with the first walkthrough video, the user provides an image search query 270 by providing user input to select a sub-frame of a 360-degree frame in the first-walkthrough video. An example embodiment of selecting sub-frame is shown in FIG. 3B. In some embodiments, the image search query 270 may include an object name, which the search module 144 associates with a stock-image. In some embodiments, the image search query 270 includes a name of a previous search, such as a search saved by a user.

The walkthrough videos 280 are one or more walkthrough videos of an environment that include at least the first walkthrough video associated with the image search query 270. As referred to herein, the walkthrough videos 280 can interchangeably refer to a single walkthrough video (e.g., the first walkthrough video) or a set of multiple walkthrough videos, unless otherwise specified. Each walkthrough video in the walkthrough videos 280 is a set of frames captured by a video capture system as the video capture system is moved along a camera path through the environment. In some embodiments, the video capture system is the video capture system 110. Each of the walkthrough videos 280 can have a different camera path through the environment, and accordingly may each have a different number of frames. Each of the walkthrough videos 280 is associated with a timestamp, the timestamp specifying a day and/or time of the set of frames was captured by the video capture system In some embodiments, each frame is associated with a timestamp, and the timestamp associated with the walkthrough video is one of the timestamps of one of the frames (e.g., the timestamp of the last frame). In some embodiments, the walkthrough videos 280 have been processed by the camera path module 132 and the module generation module 138 and are each associated with an immersive model. In some embodiments, the walkthrough videos 280 represent walkthrough videos captured at various intervals during a project showing a progression of the project. The walkthrough videos 280 can be accessed by the search module 144 from the walkthrough video storage 141.

The frame segmentation module 282 segments the sets of frames associated with the walkthrough videos 280 into sub-frames. The frame segmentation module 282 generates the sub-frames by taking overlapping crops of each frame associated with the walkthrough videos 280. The sub-frames are of a uniform size. For example, frame segmentation module 282 segments a first frame into X sub-frames by taking overlapping crops of the first frame, where X is dependent on sub-frame size and amount of overlap between the sub-frames. The frame segmentation module 282 segments each frame in each set of frames in the walkthrough videos 280 into X sub-frames. The set of sub-frames contains a collective total of X sub-frames for each frame associated with the walkthrough videos.

The feature vector module 272 generates a vector of features from an image. That is, the feature vector module 272 converts an image into an n-dimensional set of vectors of numerical values representative of image features of the image, referred to as a feature vector herein. The image features can be edges, corners, blobs, ridges, interest points, or other features identifiable by computer vision or other image processing. In some embodiments, the feature vector module 272 uses SIFT features, SURF features, a neural network or other machine-learned model, or some combination thereof to generate feature vectors. The feature vector module 272 generates a query feature vector 274 from the image associated with the image search query 270. The feature vector module 272 generates a set of sub-frame feature vectors 284 from the sub-frames. For each an input sub-frame the feature vector module 272 generates an n-dimensional sub-frame feature vector that represents the input sub-frame.

The similarity module 275 determines the set of identified portions 278 of the walkthrough videos 280 by determining similarity between the query feature vector 274 and the sub-frame feature vectors 284. The similarity module 275 contains a search index module 276 and a de-duplication module 277.

The search index module 276 inserts feature vectors into a searchable index of feature vectors. In particular, the search index module 276 indexes the sub-frame feature vectors 284 into the searchable index of feature vectors. The searchable index is organized by and searchable by image features, as represented by the feature vectors. In some embodiments, the search index module 276 uses an approximate nearest neighbor algorithm, such as locality-sensitive hashing (LSH), to insert one or more feature vectors into the searchable index. The searchable index of feature vectors can be queried by a nearest neighbor search (NNS).

The similarity module 275 uses the searchable index generated by the search index module 276 to determine a set of nearest neighbors to the query feature vector 274. The similarity module 275 queries the searchable index to return the set nearest neighbors based on a similarity metric between feature vectors in the searchable index and the query feature vector 274. In some embodiments, the similarity metric is based on cosine similarity between a feature vector in the searchable index and the query feature vector 274. If the similarity metric is less than a threshold difference for a feature vector in the searchable index, the feature vector is added to the set of nearest neighbors. That is, the set of nearest neighbors is a subset of the sub-frame feature vectors 284 that are most similar to the query feature vector 274. Each feature vector in the set of nearest neighbors is associated with a sub-frame. The set of sub-frames associated with the set of nearest neighbors is a set of proposed results. In some embodiments, the set of proposed results is further refined by the similarity module 275 using the de-duplication module 277 to determine the set of identified portions 278.

The de-duplication module 277 de-duplicates the set of proposed results such that one resulting image is returned for each real-world object (or surface) depicted in a walkthrough video. That is, because the same object is often captured in multiple frames in a walkthrough video as the video capture system is moved along the camera path through the environment, the set of proposed results can contain multiple sub-frames of the same object from different vantage points. The de-duplication module 277 uses one or more techniques to remove results in the set of proposed results that represent duplicate results of an object, such that each object is associated with one resulting sub-frame.

In some embodiments, the de-duplication module 277 sorts the set of proposed results into a sorted list in ascending order based on distance of a location of each sub-frame from a location of the image associated with the image search query. For each proposed result in the sorted list, if a proposed result is the first result in the sorted list, the proposed result is pushed to a list of de-duplicated results. If the proposed result is not the first result on the sorted list, the proposed result is compared to all de-duplicated results on the list of de-duplicated results using a duplication score. That is, for each de-duplicated result, a duplication score is calculated between the de-duplicated result and the proposed result, where the duplication score represents the likelihood that the proposed result is an image of the same real-world object as the de-duplicated result. If the duplication score is above a threshold, then the proposed result is removed from the sorted list. If the duplication score is below the threshold for every de-duplicated result on the list of de-duplicated results, then the proposed result is added to the list of de-duplicated results. In some embodiments, the resulting list of de-duplicated results is returned as the identified portions 278.

The duplication score is determined by the de-duplication module 277 by comparing two sub-frames, a sub-frame associated with the proposed result and a sub-frame associated with the de-duplicated result, and determining the likelihood that the two sub-frames are depicting a same target object in physical space. In some embodiments, the score is calculated based on, for example, (1) the similarity of image features between the two sub-frames, (2) the estimated position of the target object in three-dimensional space, and/or (3) locations of the sub-frames. The duplication score for two images is higher if the two sub-frames have high image similarity (1), have similar estimated target object positions (2), and/or similar sub-frame locations (3).

Image similarity (1) is calculated using a combination of image similarity techniques, such as based on color histogram comparison, and cosine similarity between image feature vectors (e.g., the sub-frame feature vectors 284 associated with the two sub-frames).

Estimated target object position (2) is calculated based on the intersection of rays that extend from the camera position of the 360-degree frame associated with each of the respective sub-frames through the center of the respective two-dimensional sub-frame. The rays should intersect at or near the target object if the sub-frames are of the same target object. The ray intersections can be made more precise using geometric information extracted from point cloud data in order to estimate the distance of the target object from the camera position for each ray, where point cloud data was generated from the walkthrough video using algorithms such as SLAM, or structure from motion.

Sub-frame location (3) is determined by accessing the previously determined camera path associated with the walkthrough video. Each frame in the walkthrough video is associated with a location on the camera path. Accordingly, each sub-frame of a frame has the location of the frame. If the difference in location between two sub-frames is below a threshold, the sub-frames could be images of the same object from different vantage points.

The identified portions 278 identified by the search module 144 are a set of sub-frames from the walkthrough videos 280 that are instances of objects similar to the object (or surface) in the image search query 270. In some embodiments, the identified portions 278 are the set of proposed results identified by the similarity module 275 based on a nearest neighbor query of the search index. In some embodiments, proposed results are refined into the de-duplicated results by the de-duplication module 277, and the de-duplicated results are the identified portions 278. In some embodiments, the identified portions 278 are refined and/or added to by the refinement module 290 and the additional walkthrough videos 292, as discussed below.

The refinement module 290 further refines the query feature vector 274 based on feedback indicating a relevance of one or more of the identified portions 278, according to some embodiments. In some embodiments, the refinement module 290 accesses the search visualization module 146 to provide for display the refinement interface to enable a viewer to provide feedback. In some embodiments, the feedback indicating a relevance of one or more of the identified portions 278 is a positive vote or a negative vote received from the viewer of the identified portions 278 via the refinement interface. The refinement module 290 receives the feedback from the search visualization module 146 and refines the query feature vector 274. In some embodiments, refinement module 290 refines the query feature vector 274 by increasing a weight associated with a feature corresponding to positive feedback and decreasing a weight associated with a feature corresponding to negative feedback. The refinement module 290 provides the refined query feature vector 274 to the similarity module 275. In some embodiments, the similarity module 275 processes the sub-frames of the walkthrough videos 280 again to determine a set of additional identified portions 278 of the walkthrough videos 280 by determining similarity between the refined query feature vector 274 and the sub-frame feature vectors 284.

The additional walkthrough videos 292 are one or more additional walkthrough videos of the environment that are searched by the search module 144, according to some embodiments. The additional walkthrough videos 292 have the same properties as previously discussed in relation to the walkthrough videos 280. In some embodiments, a user may manually provide a search request to search the additional walkthrough videos 292. In some embodiments, the spatial indexing system 130 may automatically provide the additional walkthrough videos 292 to the search module 144 when there are additional walkthrough videos 292 in the walkthrough video store 141 associated with the environment. In some embodiments, the additional walkthrough videos 292 are automatically searched responsive to the refinement module 290 refining the query feature vector 274. For example, in one embodiment, the walkthrough videos 280 contains only the first walkthrough video, and the additional walkthrough videos 292 associated with the environment are searched after refinement of the query feature vector 274.

The additional walkthrough videos 292 are provided to the frame segmentation module 282, which generates additional sub-frames. The additional subframes 284 are provided to the feature vector module 272, which generates additional sub-frame feature vectors 284. The additional sub-frame feature vectors 284 are provided to the similarity module 275. The search index module 276 indexes the additional sub-frame feature vectors into the search index. The similarity module 275 queries the search index for a set of additional nearest neighbors based on similarity to the refined query feature vector 274, the additional nearest neighbors being associated with additional proposed results. The additional proposed results are de-duplicated by the de-duplication module 277, resulting in a set of additional identified portions 279. The identified portions 278 and, as applicable, the additional identified portions 279 are provided to the search visualization interface 146 for display.

In some embodiments, the image search query 270 and walkthrough videos 280 are not associated with an immersive model. That is, a camera path 226 and/or an immersive model 266 are not necessary for the search module 144 or search visualization module 146. For example, sub-frame location, as used by the search visualization module 146 and the de-duplication module 277, can be determined based on data associated with the walkthrough videos 280 (e.g., the video capture system 110 collects motion data and location data that can be used to determine frame and sub-frame location). Similarly, in the case of the search visualization interface, some embodiments of the first portion do not include a representation of the camera path. Additionally, the walkthrough video 280 may comprise 2D frames of video instead of 360-degree video.

VII. Visualization Interface—Examples

FIGS. 3A-3G are screenshots illustrating portions of an immersive model provided by the model visualization module 142 and search visualization interfaces provided by the search visualization module 146, according to one embodiment. As described above in FIG. 1, the search visualization module 146 generates the search visualization interface, which allows a user to view results of an image search query.

The screenshots shown in FIGS. 3A-3G continue with a general contracting company example, similar to general contracting examples mentioned above. As framing is being completed on a construction site, the general contractor captures a walkthrough video that is a sequence of frames inside each unit to create a record of the progress of work being done. The captured frames are provided as input to the camera path module 132, which generates a vector of 6D camera poses (one 6D pose for each frame) that constitute a camera path. The camera path and walkthrough video are provided as input to the model generation module 138, which generates an immersive model. The user can view the immersive model by using the client device 150 to view the visualization interface provided by the model visualization module 142. Via the visualization interface, the user can navigate to different frames in the sequence by selecting icons on a 2D overhead view map that includes a representation of the floorplan of the environment. After the user has selected the icon for a frame in the 2D overhead map, the visualization interface displays a first-person view of the frame that the user can pan and zoom.

FIG. 3A shows an example display of a first-person view of the visualization interface generated by the model visualization module 142. The first-person view also includes waypoint icons representing the positions of other captured frames, and the user can navigate to the first-person view of one of these other frames by selecting the waypoint icon for the frame. Each waypoint icon is rendered based on a route vector that points from the frame being displayed to the other frame. In the first-person view shown in FIG. 3A, the waypoint icons are blue circles.

Referring back to the general contracting company example, two months after the walkthrough video is recorded, the general contractor discovers several lift tables are missing. Traditionally, determining the location of the missing lift tables would require manual investigative effort. At best, the general contractor could use word of mouth to attempt to determine the last known locations, but given the amount of time passed, such an effort would likely be unsuccessful. Alternatively, the general contractor could get all workers to suspend work to search for the missing item, but this would be costly and cause delays on substantive work on the construction site. Instead, the general contractor is able to access the object image search feature to identify locations of lift tables in the walkthrough video from two months ago. The general contractor can propagate the search to all walkthrough videos taken over time, and view the results in the search visualization interface. The general contractor can click through the results to get an accounting of the locations and quantities of lift tables over time, and definitively determine the last known locations of the lift tables. In the example in FIG. 3A, a user has rolled a pointer over the object search feature in the visualization interface of the immersive model.

For example, in FIG. 3B, the user has toggled the object search feature and is using the pointer to select a sub-frame 310 that encompasses an object. As prompted by the display, the user selects a sub-frame 310 to search as demarcated by the dotted line. In this example, the user has selected a lift table to search for in video. The search module 144 performs an object search to search for other instances of the object in the sub-frame 310 (e.g., the lift table) in the walkthrough video associated with the immersive model. The sub-frame 310 of the lift table selected as prompted by the object search feature is an example of the image search query 270 and the walkthrough video associated with the immersive model being viewed is an example of walkthrough videos 280.

FIG. 3C shows an example of the refinement interface 320 displaying the identified portions 322 returned by the search module 144. The example refinement interface 320 shown in FIG. 3C has two portions. The right-hand portion of the refinement interface displays a floorplan with several markers 324. The floorplan is associated with the environment of the walkthrough video. The markers 324 indicate the respective location of each identified portion 322 within the environment. That is, for an identified portion 322, a marker 324 marks the location along the camera path of the frame associated with the identified portion 322. The markers 324 are useful for indicating to the user the location of each object in the physical environment. Clusters and patterns can be made obvious by the right-hand display.

The left-hand portion of the example refinement interface 320 in FIG. 3C displays the identified portions 322 of frames in the walkthrough video that have objects resembling the lift table in the image search query. Overlaid on each identified portion are feedback buttons 326 as indicated by a thumbs-up and a thumbs-down. The user can select the thumbs up to provide positive feedback and indicate that the object in the identified portion is an instance of the object in the image search query. The user can select the thumbs down to provide negative feedback and indicate that the object in the identified portion is not an instance of the object in the image search query. When done providing feedback via the feedback buttons 326, the user can select the 'view all results' button to view additional identified portions. The refinement module 290 receives the feedback and refines the search, and the search module 144 searches additional walkthrough videos 290 to determine additional identified portions 279. In this example, the additional walkthrough videos 290 are different walkthrough videos of the construction site taken by the general contractor at previous dates.

Figure 3D:
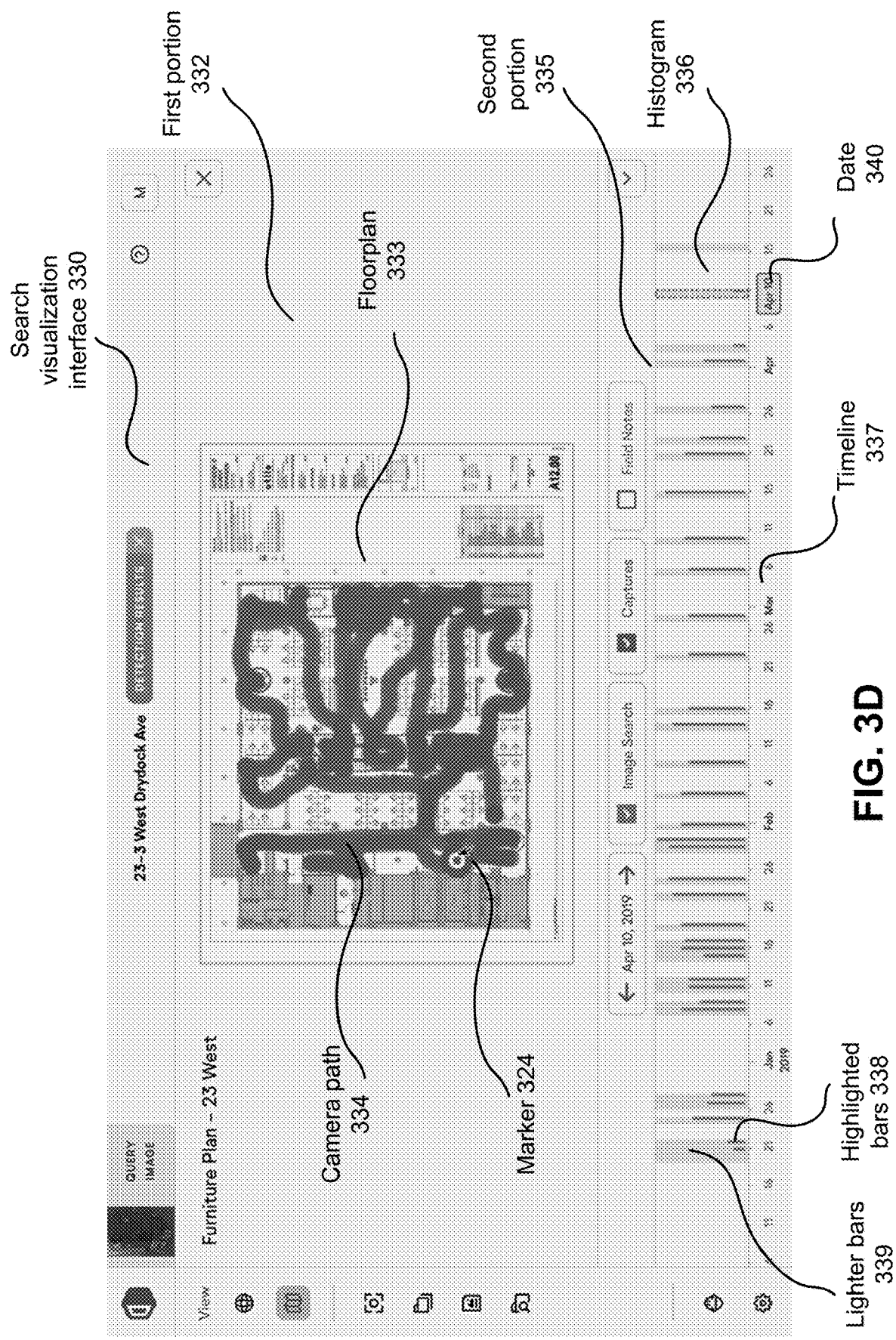

FIG. 3D shows an example of the two-portion search visualization interface 330. The first portion 332, on top, displays a representation of a floorplan 333 of the environment with highlighted markers 324 at locations within the representation of the floorplan 333 corresponding to the identified portions of frames of the walkthrough video. In this example, the first portion 332 includes only one highlighted marker 324. Also highlighted is the camera path 334 associated with the walkthrough video, which snakes through the floorplan 333. The second portion 335, on bottom, displays a histogram 336, the independent axis of the histogram comprising a timeline 337 corresponding to the timestamps of the additional walkthrough videos. In this example, the timeline 337 of the histogram 336 has dates spanning several months. The histogram includes highlighted bars 338 indicating instances of the identified additional portions of frames within the additional walkthrough videos. A lighter-colored bar 339 of the histogram of uniform height indicates a walkthrough video was taken on a particular day. A darker-colored or highlighted bar 338 over the lighter-colored bar 339 indicates the number of identified portions of frames included in the respective walkthrough video. That is, the darker-colored or highlighted bar 338 indicates the number of objects (e.g., lift tables) in the environment on the respective date on the timeline 337.

Figure 3E:
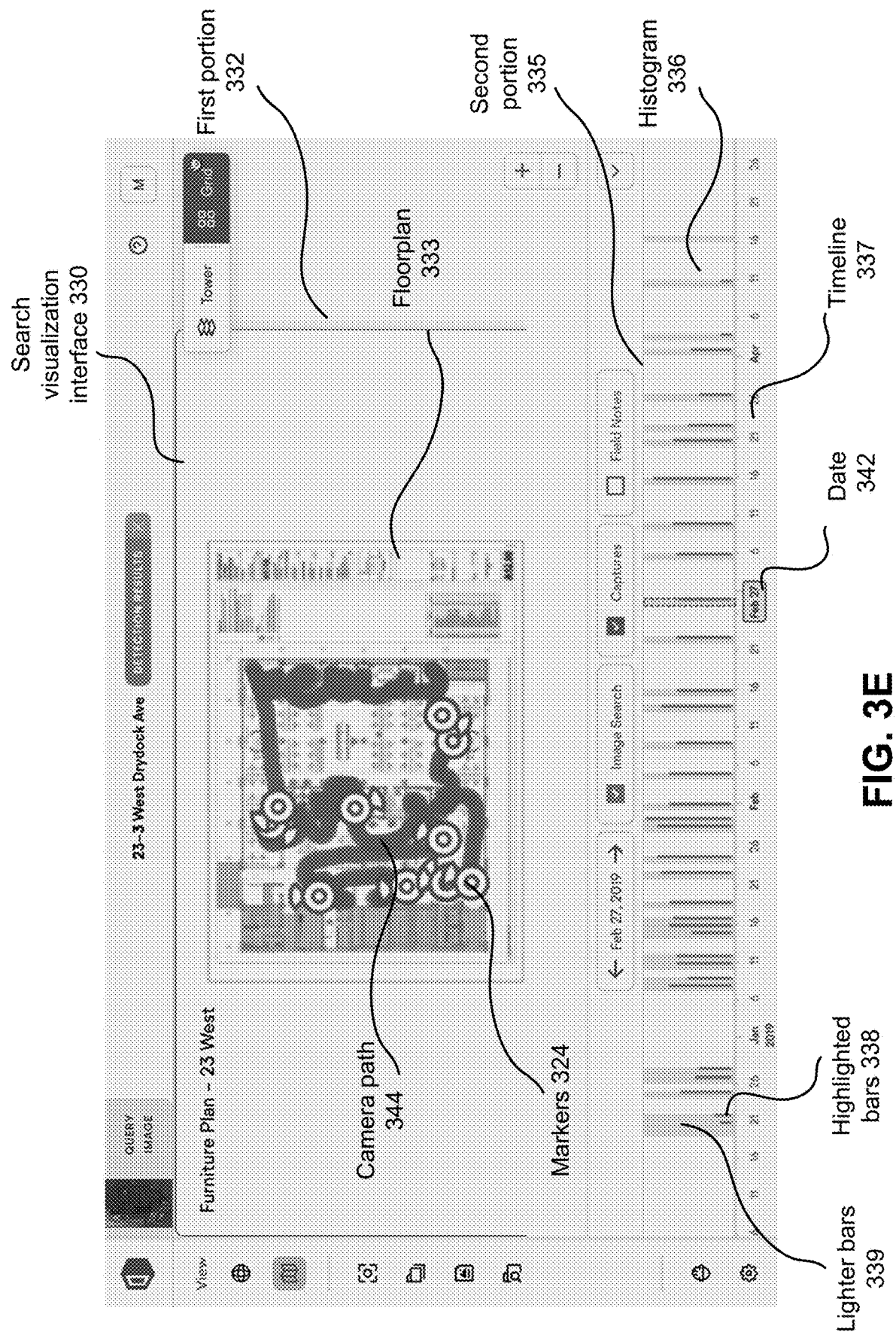

In FIG. 3D, the walkthrough video and identified portions represented in the first portion are the date 340 of April 10, as marked in the timeline 337 of the second portion 335. The viewer can interact with the search visualization interface 330. For example, each bar of the histogram, when selected, causes search results corresponding to a walkthrough video captured at the timestamp associated with the selected bar to be displayed within the first interface portion 332. When the user selects the bar at the date 342 of February 27, the interface shown in FIG. 3E is displayed. FIG. 3E shows a different walkthrough video in the same two-part search visualization interface 330 as FIG. 3D. The walkthrough videos are associated with the same environment, so the floorplan 333 is the same in FIGS. 3D and 3E. However, 3E has a different camera path 344 associated with the walkthrough videos, as shown. Additionally, the walkthrough video from the date 342 of February 27 has more identified portions, as indicated by the highlighted markers 324 indicating instances of objects.

Returning to the general contractor example, the general contractor can use this search visualization interface to view the location and quantity of the lift tables at a particular date, and how the lift tables move and change over time by toggling along the timeline. For example, by April 10, there is only one lift table left. But, by going back to February 27, the general contractor can see there are many more lift tables. The general contractor can view the results between February 27 and April 10 to track down the last locations of the missing lift tables. By using the search visualization interface 330 to "travel back in time" and view the how the lift tables move and change over time, the general contractor can keep track of various equipment on the construction site. Furthermore, because the spatial indexing system 130 can perform the object image search without having a user perform physical searching or manually searching through videos, the process of keeping track of equipment and objects is more efficient.

Figure 3F:
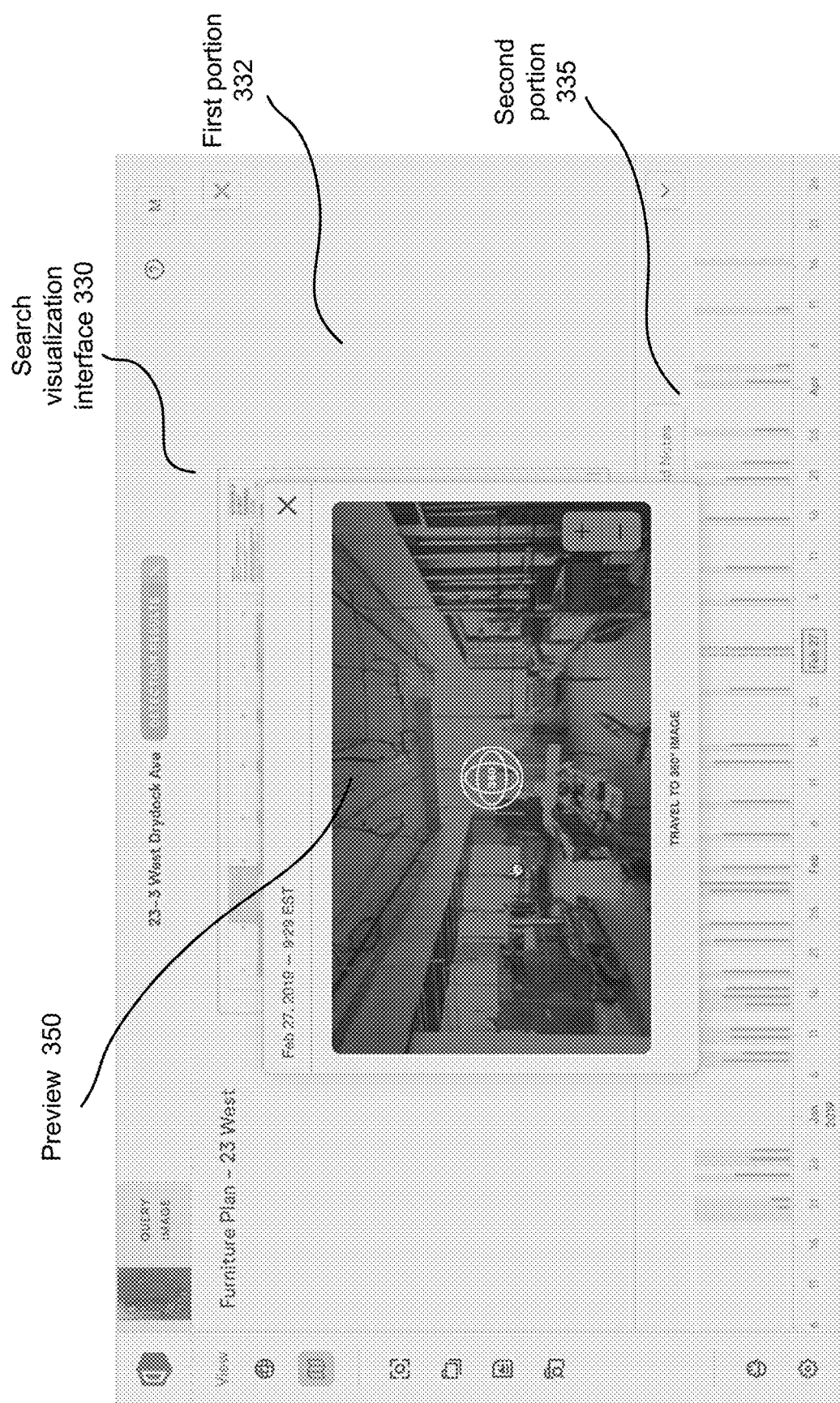

To confirm each identified portion is in fact an instance of the object, the user can select the highlighted marker 324 to view the frame associated with the identified portion. An example is shown in FIG. 3F. The user can see a preview 350 of the 360-degree frame. The user can further toggle to 'travel to 360-degree image' and the spatial indexing system 130 will take the user into the visualization interface of the immersive model. The user can view both the instance of the object in the identified portion, and the surroundings as captured in the immersive model.

Figure 3G:
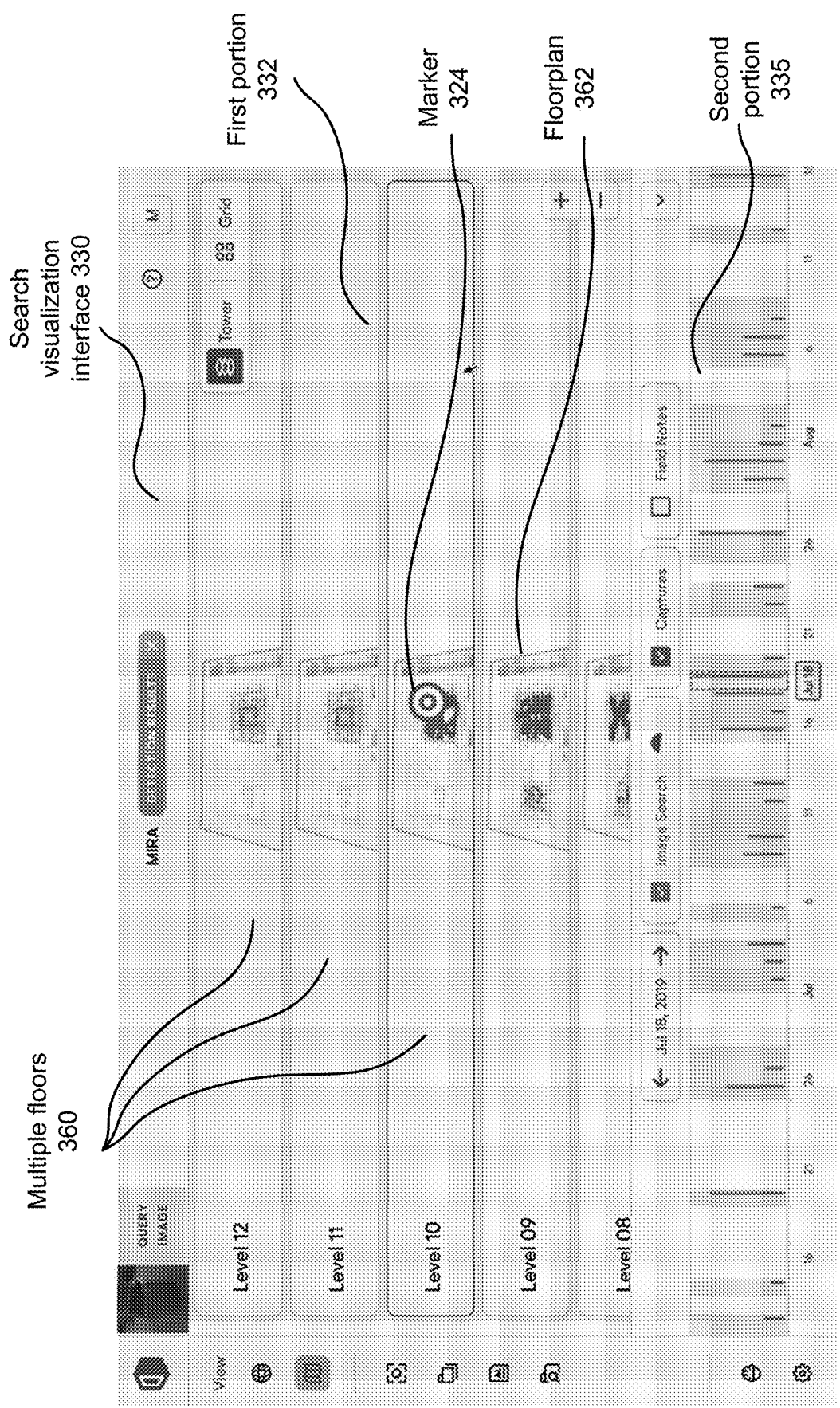

In some embodiments, the environment spans multiple floors 360. Walkthrough videos can be associated with multiple floors 360, the floorplan 362 spans the multiple floors 360. FIG. 3G shows an example of such an embodiment, where the first interface portion 332 includes a scrollable representation of the multiple floors 360 such that a viewer can scroll to view highlighted markers 324 corresponding to the identified portions of frames across multiple floors 360. This scrolling view is known as tower view. The user can select a particular floor to view the floor's results of the search in larger detail.

In another example, a general contractor of a construction site can use the object search to track progress of tasks on the construction site. For example, the general contractor uses the object search to search for pallets of drywall. The general contractor can use the search visualization interface to determine the date the drywall pallets arrived on the construction site (e.g., the earliest walkthrough video that has highlighted bar in the histogram indicating instances of pallets of drywall included in the respective walkthrough video). Similarly, the general contractor can use the search visualization interface to determine the date when the last of the drywall was installed (e.g., the latest walkthrough video that has highlighted bar in the histogram indicating instances of pallets of drywall included in the respective walkthrough video). By being retroactively able to determine the beginning and end dates of drywall installation, the general contractor can certify the bill received from the sub-contractor installing the drywall is accurate. If the sub-contractor is over-billing the general contractor, the general contractor can use the results object image search to dispute the bill.

Additionally, the general contractor can track the progress of the drywall installation by searching for a surface that corresponds to the drywall surface. The search visualization interface will display in the first portion highlighted markers indicating where there are instances of drywall surface, i.e., the drywall has been installed. By toggling through the walkthrough videos taken at different dates, the general contractor can view and keep track of the progression of the drywall installation. This may be useful both for tracking progress and to diagnose problems after drywall installation. For example, two months after the images are recorded, a problem is discovered in one of the units that requires the examination of electrical work that is hidden inside one of the walls. Traditionally, examining this electrical work would require tearing down the drywall and other completed finishes in order to expose the work, which is a very costly exercise. However, the general contractor is instead able to access the search visualization interface and quickly determine the date the drywall was installed on the wall in question. The general contractor can then refer to a preceding walkthrough video in the visualization interface of the immersive model to view the electrical work before it was covered with the drywall. Accordingly, the general contractor can inspect the electrical issues while avoiding the need for costly removal of the drywall.

VIII. Spatial Indexing of Frames Based on Floorplan Features

As noted above, the visualization interface can provide a 2D overhead view map that displays the location of each frame within a floorplan of the environment. In addition to being displayed in the overhead view, the floorplan of the environment can also be used as part of the spatial indexing process that determines the location of each frame.

Figure 4:
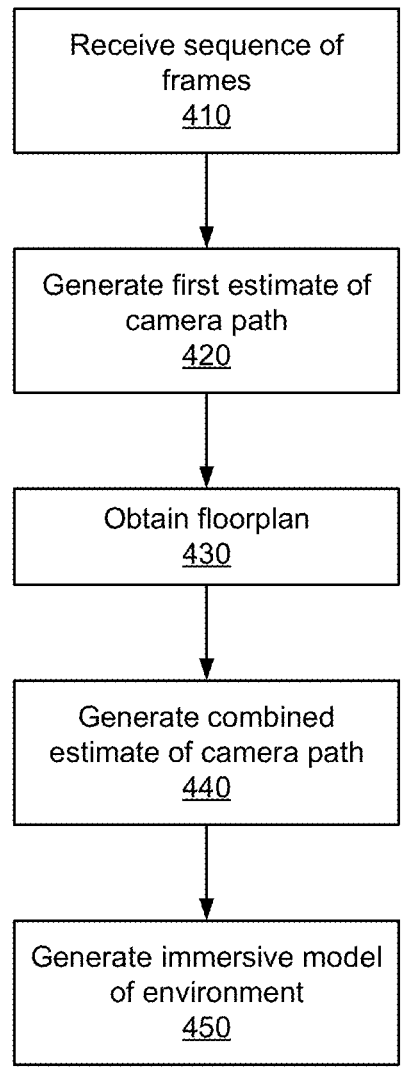
FIG. 4 is a flow chart illustrating an example method for automated spatial indexing of frames using features in a floorplan, according to one embodiment.

FIG. 4 is a flow chart illustrating an example method 400 for automated spatial indexing of frames using features in a floorplan, according to one embodiment. In other embodiments, the method 400 may include additional, fewer, or different steps, and the steps shown in FIG. 4 may be performed in a different order. For instance, the method 400 may be performed without obtaining 430 a floorplan, in which case the combined estimate of the camera path is generated 440 without using features in the floorplan.

The spatial indexing system 130 receives 410 a walkthrough video that is a sequence of frames from a video capture system 110. The frames in the sequence are captured as the video capture system 110 is moved through an environment (e.g., a floor of a construction site) along a camera path. In one embodiment, each of the frames is a 360-degree frame that is captured by a 360-degree camera on the video capture system (e.g., the 360-degree camera 112 described above with respect to FIG. 1). In another embodiment, each of the frames has a narrower field of view, such as 90 degrees.

The spatial indexing system 130 generates 420 a first estimate of the camera path based on the walkthrough video that is a sequence of frames. The first estimate of the camera path can be represented, for example, as a six-dimensional vector that specifies a 6D camera pose for each frame in the sequence. In one embodiment, a component of the spatial indexing system 130 (e.g., the SLAM module 216 described above with reference to FIG. 2A) performs a SLAM algorithm on the walkthrough video that is a sequence of frames to simultaneously determine a 6D camera pose for each frame and generate a three-dimensional virtual model of the environment.

The spatial indexing system 130 obtains 430 a floorplan of the environment. For example, multiple floorplans (including the floorplan for the environment that is depicted in the received walkthrough video that is a sequence of frames) may be stored in the floorplan storage 136, and the spatial indexing system 130 accesses the floorplan storage 136 to obtain the floorplan of the environment. The floorplan of the environment may also be received from a user via the video capture system 110 or a client device 150 without being stored in the floorplan storage 136.

The spatial indexing system 130 generates 440 a combined estimate of the camera path based on the first estimate of the camera path and the physical features in the floorplan. Two example methods 500, 600 of generating the combined estimate of the camera path 440 are described below with respect to FIGS. 5 and 6, respectively.

After generating 440 the combined estimate of the camera path, the spatial indexing system 130 generates 450 an immersive model of the environment. For example, the model generation module 138 generates the immersive model by combining the floorplan, a plurality of route vectors, the combined estimate of the camera path, and extracted frames from the walkthrough video that is a sequence of frames, as described above with respect to FIG. 2B.

In some embodiments, the spatial indexing system 130 may also receive additional data (apart from the walkthrough video that is a sequence of frames) that was captured while the video capture system is being moved along the camera path. For example, the spatial indexing system also receives motion data or location data as described above with reference to FIG. 1. In embodiments where the spatial indexing system 130 receives additional data, the spatial indexing system 130 may use the additional data in addition with the floorplan when generating 440 the combined estimate of the camera path.

In an embodiment where the spatial indexing system 130 receives motion data along with the walkthrough video that is a sequence of frames, the spatial indexing system 130 can perform a dead reckoning process on the motion data to generate a second estimate of the camera path, as described above with respect to FIG. 2A. In this embodiment, the step of generating 440 the combined estimate of the camera path includes using portions of the second estimate to fill in gaps in the first estimate of the camera path. For example, the first estimate of the camera path may be divided into camera path segments due to poor feature quality in some of the captured frames (which causes gaps where the SLAM algorithm cannot generate a reliable 6D pose, as described above with respect to FIG. 2A). In this case, 6D poses from the second path estimate can be used to join the segments of the first path estimate by filling in the gaps between the segments of the first path estimate.

As noted above, in some embodiments the method 400 may be performed without obtaining 430 a floorplan and the combined estimate of the camera path is generated 440 without using features in the floorplan. In one of these embodiments, the first estimate of the camera path is used as the combined estimate of the camera path without any additional data processing or analysis.

In another one of these embodiments, the combined estimate of the camera path is generated 440 by generating one or more additional estimates of the camera path, calculating a confidence score for each 6D pose in each path estimate, and selecting, for each spatial position along the camera path, the 6D pose with the highest confidence score. For instance, the additional estimates of the camera path may include one or more of: a second estimate using motion data, as described above, a third estimate using data from a GPS receiver, and a fourth estimate using data from an IPS receiver. As described above, each estimate of the camera path is a vector of 6D poses that describe the relative position and orientation for each frame in the sequence.

The confidence scores for the 6D poses are calculated differently for each path estimate. For instance, confidence scores for the path estimates described above may be calculated in the following ways: a confidence score for a 6D pose in the first estimate (generated with a SLAM algorithm) represents the feature quality of the frame corresponding to the 6D pose (e.g., the number of detected features in the frame); a confidence score for a 6D pose in the second estimate (generated with motion data) represents a level of noise in the accelerometer, gyroscope, and/or magnetometer data in a time interval centered on, preceding, or subsequent to the time of the 6D pose; a confidence score for a 6D pose in the third estimate (generated with GPS data) represents GPS signal strength for the GPS data used to generate the 6D pose; and a confidence score for a 6D pose in the fourth estimate (generated with IPS data) represents IPS signal strength for the IPS data used to generate the 6D pose (e.g., RF signal strength).

After generating the confidence scores, the spatial indexing system 130 iteratively scans through each estimate of the camera path and selects, for each frame in the sequence, the 6D pose having the highest confidence score, and the selected 6D pose is output as the 6D pose for the frame in the combined estimate of the camera path. Because the confidence scores for each path estimate are calculated differently, the confidence scores for each path estimate can be normalized to a common scale (e.g., a scalar value between 0 and 1, with 0 representing the lowest possible confidence and 1 representing the highest possible confidence) before the iterative scanning process takes place.

IX. Camera Path Generation—Floorplan Alignment with Brute Force Search

Figure 5:
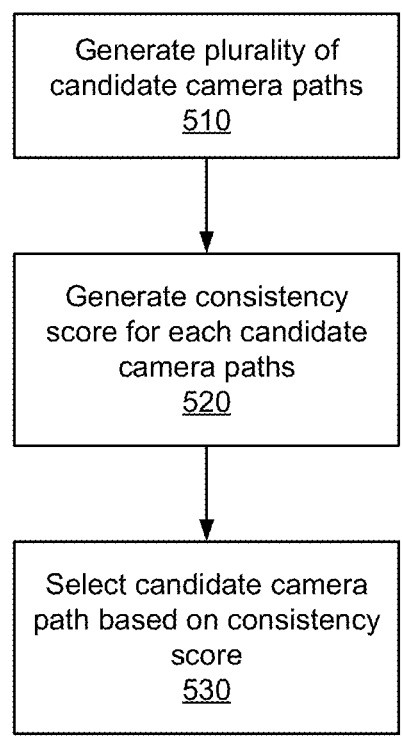
FIG. 5 is a flow chart illustrating an example method for aligning a camera path with a floorplan using a brute force search, according to one embodiment.

FIG. 5 is a flow chart illustrating a method 500 for generating a combined camera path with a floorplan using a brute force search, according to one embodiment. In other embodiments, the method 500 may include additional, fewer, or different steps, and the steps shown in FIG. 5 may be performed in a different order.

The brute force search described in FIG. 5 aligns an estimate of the camera path with a floorplan by generating multiple candidate camera paths (e.g., by applying different scaling, rotation, and translation operations on the camera path estimate) and selecting the candidate camera path that has the highest consistency score relative to the features on the floorplan. As noted above, in some embodiments the first estimate of the camera path can be divided into a plurality of camera path segments (e.g., due to poor feature quality in some of the captured frames). In these embodiments, the brute force search can be performed separately for each of the camera path segments to align each camera path segment with the floorplan. After aligning each of the camera path segments with the floorplan, the spatial indexing system can then use other data, such as motion data, to fill in the gaps in the camera path between the aligned camera path segments. The combination of the aligned camera paths and the filled-in gaps is then output as the combined camera path.

For ease of description, the brute force search is described below with respect to a camera path segment. However, the brute force search can also performed on the entirety of the first path estimate. For example, in some embodiments the first estimate of the camera path is not divided into segments (e.g., because each frame in the sequence of 360-degree frames includes features of sufficiently high quality). In these embodiments, the brute force search described in FIG. 5 is performed on the entirety of the first path estimate to align the first path estimate with the floorplan. In these embodiments, the result of the brute force search is output as the combined path estimate.

Referring now to FIG. 5, the spatial indexing system 130 generates 510 a plurality of candidate camera paths by applying a variety of transformations such as scaling, rotation, and translation operations to the camera path segment.

The spatial indexing system 130 compares each candidate camera path to the features in the floorplan and generates a consistency score for each of the candidate camera paths. The consistency score for a candidate camera path represents the degree of consistency between the candidate camera path and the floorplan.

In one embodiment, the consistency score is a weighted sum of four components. The first component represents the level of similarity between the candidate camera path and the features in the floorplan. For example, the first component can be calculated by generating an intersect score for each instance the candidate camera path intersects a feature in the floorplan, and then combining the intersect scores (e.g., by adding them together). The intersect score represents the likelihood of the real-world camera path passing through the type of feature being intersected (e.g., a high intersect score is generated for intersecting a door, while a low intersect score is generated for intersecting a wall).

The second and third components are based on location data received from the video capture system 110. The second component represents a degree of consistency between the candidate camera path and data from a GPS receiver on the video capture system. For instance, the second component is calculated by combining the distances between a location implied by the candidate camera path and a location specified by the location data at the same point in time. Meanwhile, the third component represents a degree of similarity between the candidate camera path and data from an IPS receiver on the video capture system 110. The third component can be computed in the same manner as the second component. In embodiments where the spatial indexing system 130 does not receive location data from the video capture system 110 (or only receives one type of location data), one or both of these components can be omitted from the consistency score.

The fourth component is generated by comparing features in the captured walkthrough video that is a sequence of frames with features from frames that were previously captured at the same location on the floorplan. In an embodiment where the consistency score includes the fourth component, the spatial indexing system 130 stores previously-captured frames in association with their floorplan locations (e.g., as part of one of the models in the model storage 140).

After generating the consistency scores for the candidate camera paths, the spatial indexing system 530 selects one candidate camera path based on the consistency scores. For example, the spatial indexing system 530 selects the candidate camera path with the highest consistency score.

X. Camera Path Generation—Floorplan Alignment with Grid Map

Figure 6A:
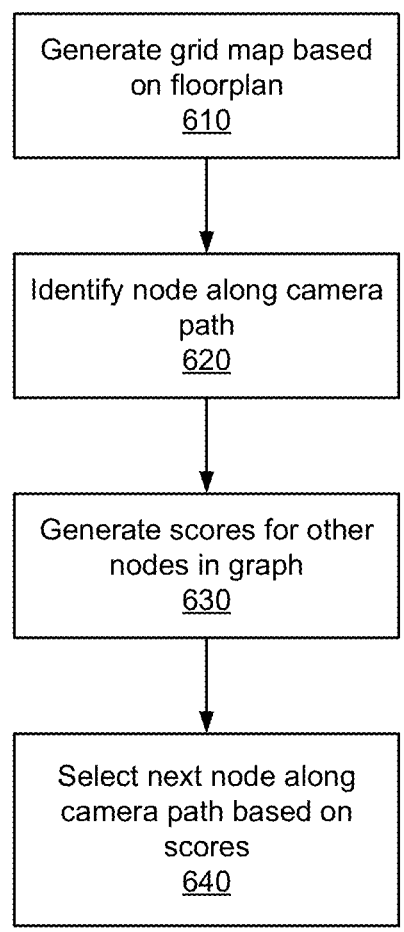
FIG. 6A is a flow chart illustrating an example method for aligning a camera path with a floorplan using a grid map of a floorplan, according to one embodiment.

FIG. 6A is a flow chart illustrating an example method 600 for generating a combined camera path using a grid map of a floorplan, according to one embodiment. In other embodiments, the method 600 may include additional, fewer, or different steps, and the steps shown in FIG. 6A may be performed in a different order.

The spatial indexing system 130 generates 610 a grid map based on the floorplan. The grid map is a graph in which each node represents a spatial position on the floorplan, and each edge between two nodes specifies a transition score that represents the traversability of the space between the two nodes. The transition score for an edge is determined based on the presence of features between the two nodes. For example, if a wall is present between the two nodes, then the transition score for the edges between those two nodes is lower to indicate that the camera path is unlikely to cross between the two nodes. In contrast, if a door is present between two nodes, then the transition score for the edge between the two nodes is higher.

In one embodiment, the weights for edges that pass through walls are adjusted over time. For example, at a first time (e.g., at an early stage in construction when the framing for the walls is not yet in place), the weights for these edges are assigned the same value as the weights for edges that pass through empty space inside a room. At a second time (e.g., at an intermediate stage in construction when the framing has been constructed, but the drywall is not yet in place), the weights for these edges are assigned a reduced value to indicate that physically passing through the wall is possible but not common. At a third time (e.g., at a later stage in construction when both the framing and the drywall are in place), the weights for these edges are assigned a low value to indicate that passing through the wall is physically impossible. The times corresponding to the first time, the second time, and the third time may be received as user input from a client device 150, determined based on a construction schedule provided to the spatial indexing system 130, or by performing feature recognition on some or all of the frames in the sequence to determine the construction progress on the walls.

In one embodiment, the presence of a floorplan feature (such as a wall or a door) between two nodes is detected using a computer vision feature classifier. In this embodiment, the feature classifier extracts frame features (e.g., SIFT SURG, or ORB features) from a frame of the floorplan and uses the frame features to classify different features (e.g., walls and doors) that appear at various positions in the floorplan. The feature classifier can be trained, for example, using training data that includes a plurality of manually annotated floorplans. In other embodiments, the presence of a feature between two nodes can be detected manually (e.g., by user input) or by using metadata within the floorplan.

Figure 6B:
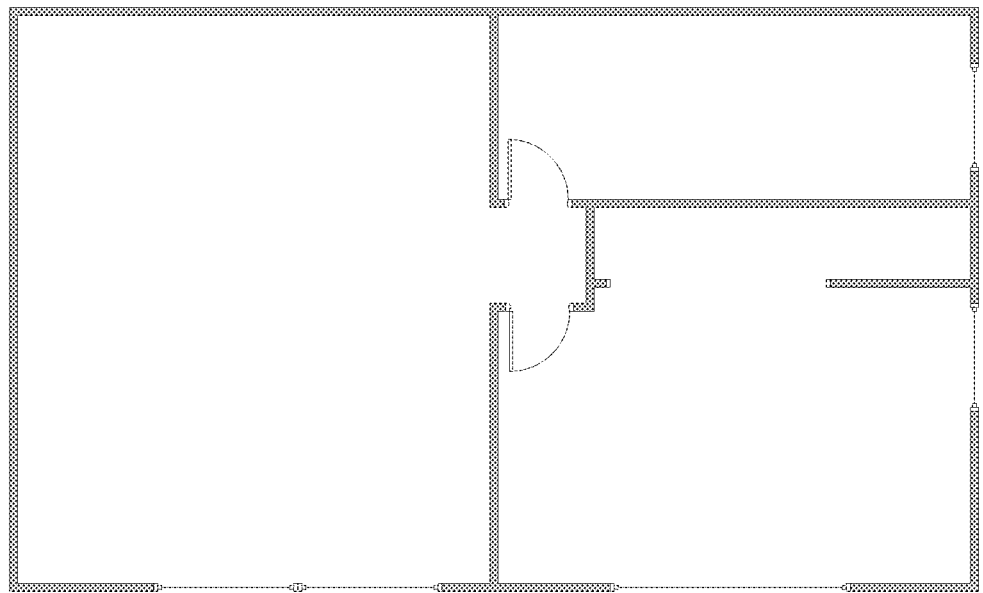
FIG. 6B illustrates an example of a floorplan, according to one embodiment.
Figure 6C:
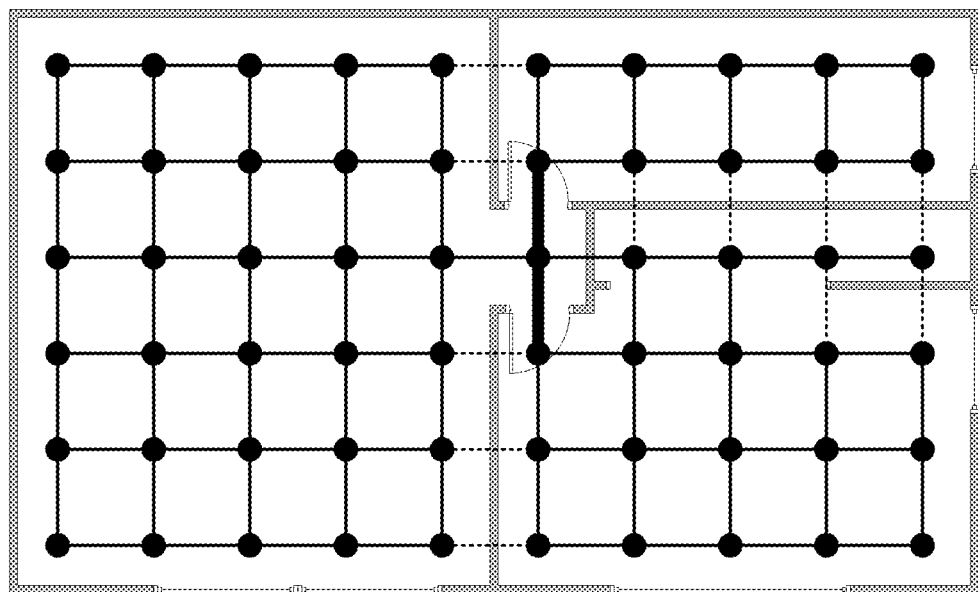
FIG. 6C illustrates an example of a grip map, according to one embodiment.

FIG. 6B illustrates an example of a floorplan, and FIG. 6C illustrates an example of a grip map that is generated for the floorplan. In the example grid map shown in FIG. 6C, the nodes are equally spaced in both the horizontal and vertical directions so that the nodes and edges for a two-dimensional grid of squares. Edges having a lower transition score are illustrated in FIG. 6C with dotted lines, and edges having a higher transition score are illustrated with thicker lines. As shown in FIG. 6C, the edges that cross the walls have a lower transition score, while the edges that pass through the two doors have a higher transition score.

After generating 610 the grid map, the spatial indexing system 130 performs an iterative Map Matching algorithm to match the first estimate of the camera path to the grid map. The Map Matching algorithm can be, for example, a Hidden Markov Model (HMM), a conditional random field (CRF), or some other type of Map Matching algorithm.

In the embodiment shown in FIG. 6A, the spatial indexing system 130 performs Map Matching by performing a Markov process to iteratively identify nodes along a path through the grid map that match the first estimate of the camera path.

An iteration of the Markov process begins by identifying 620 one node along the camera path. When the process is initiated, the first node that is identified is the starting point of the camera path. The starting point may be provided as user input or determined based on location data (e.g., GPS or IPS data) received from the video capture system 110.

Once a node has been identified, the spatial indexing system 130 generates 630 scores for a plurality of the other nodes in the grid map. In one embodiment, the spatial indexing system 130 scores every other node in the graph apart from the identified node. In other embodiments, the spatial indexing system 130 scores a subset of the other nodes in the graph. For example, the spatial indexing system 130 scores each node that is separated from the identified node by less than a threshold number of edges (i.e., the spatial indexing system 130 scores the nodes that are close to the identified node). This may be useful, for example, when the grid map includes a large number of nodes and edges and it would be too computationally intensive to score each of the other nodes.

The scores are generated 630 based on the transition scores for the edges between the identified node and the other node. The score is further based on the direction of the first estimate of the camera path near the identified node. For instance, if the first estimate of the camera path travels to the left near the identified node, then a higher score is generated for the edge connecting the identified node to the adjacent node on its left, while lower scores are generated for the edges connecting the identified node to the adjacent nodes above, below, and to the right. The score is also based on the distance traveled by the first estimate of the camera path near the identified node. For example, if the next 6D pose vector on the camera path is 4 feet away, and adjacent nodes in the grid map are separate by a distance of 2 feet, then nodes that are separated from the identified node by two edges are assigned a higher score.

The spatial indexing system 130 uses the scores for each of the other nodes to select 640 one of other nodes as the next nodes along the camera path. The selected node is designated as the new identified node, and the steps of generating scores 630 for other nodes and selecting 640 the next node in the camera path are repeated until nodes along the entire camera path have been identified. The spatial indexing system 130 can then perform a Viterbi algorithm to identify the most likely path through the grid map based on the identified nodes. The identified path can then be provided as the output of the step of generating 440 the combined estimate of the camera path.

XI. Visualization Interface—Object Image Search Examples

Figure 7:
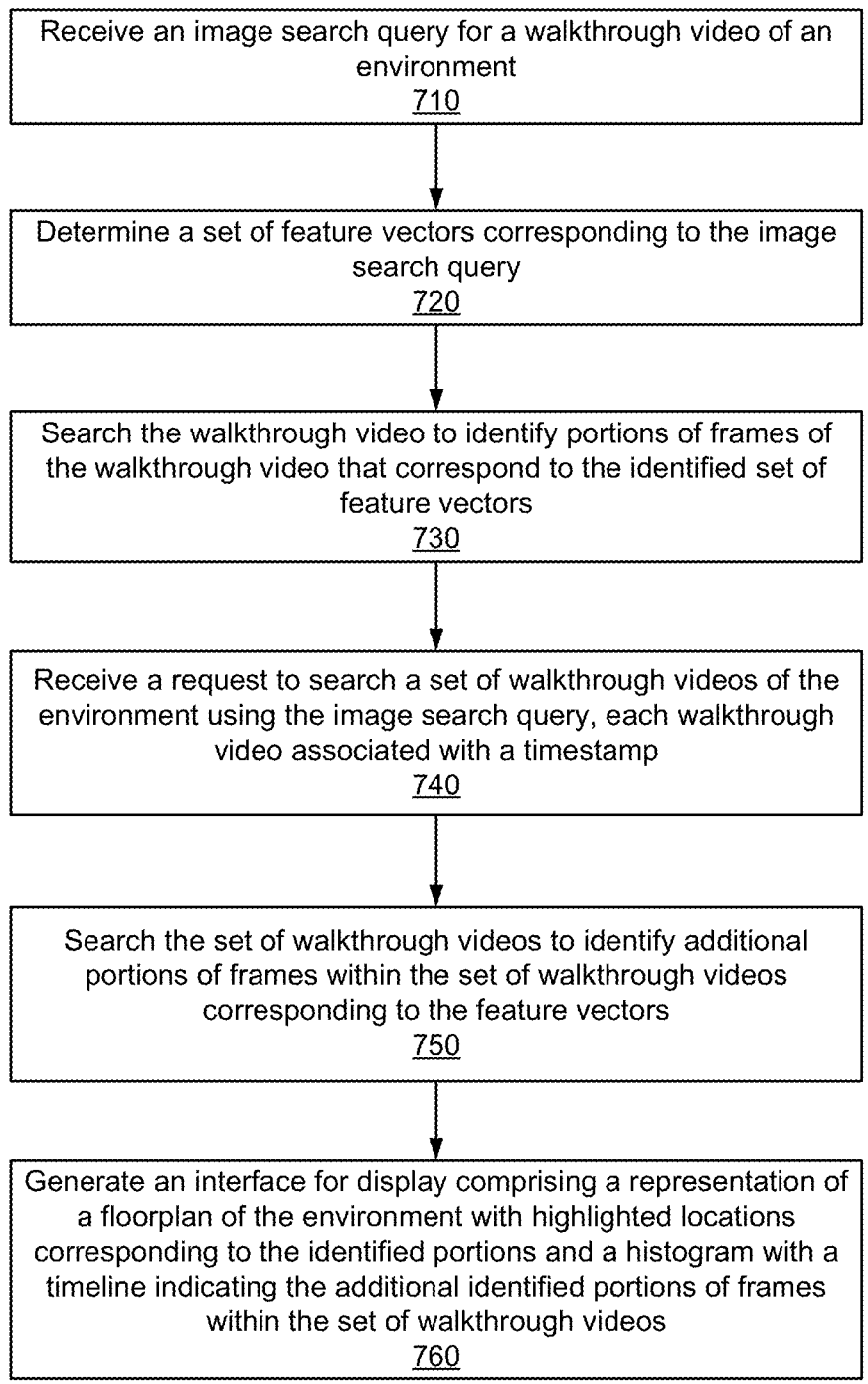
FIG. 7 is a flow chart illustrating an example method for an object search in walkthrough videos, according to one embodiment.

FIG. 7 is a flow chart illustrating an example method 700 for an object image search in walkthrough videos, according to one embodiment. In other embodiments, the method 700 may include additional, fewer, or different steps, and the steps shown in FIG. 7 may be performed in a different order.

The spatial indexing system 130 receives 710 an image search query for a walkthrough video of an environment. In some embodiments, the image search query includes an object or surface for the spatial indexing system 130, in particular the search module 144, to search for in the walkthrough video. The image search query includes or is associated with an image of the object or surface specified in the image search query. In some embodiments, the received image search query comprises a selection of a portion of a frame of the walkthrough video. In some embodiments, the image search query is the image search query 270 and the walkthrough video is the walkthrough videos 280.

The spatial indexing system 130 determines 720 a set of feature vectors corresponding to the image in the image search query. The set of feature vectors is a n-dimensional set of vectors of numerical values representative of image features of the image. Accordingly, the set of feature vectors is a representation of the object or surface in the image. In the embodiment where the received image search query comprises a selection of a portion of a frame of the walkthrough video, the identified feature vectors are representative of image features of the selected portion of the frame of the walkthrough video. In some embodiments, the set of feature vectors is generated by the feature vector module 272.

The spatial indexing system 130 searches 730 the walkthrough video to identify portions of frames of the walkthrough video that correspond to the identified set of feature vectors. The identified portions are sub-frames of the walkthrough video that contain instances objects or surfaces that are similar to that in the image search inquiry. In some embodiments, the identified portions are determined by comparing the similarity of feature vectors associated with sub-frames to the set of feature vectors associated with the image search query. In some embodiments, a difference between a feature vector corresponding to an identified portion of a frame of the walkthrough video and an identified feature vector corresponding to the image search query is less than a threshold difference. In some embodiments, the identified portions are determined by the similarity module 275 and are the identified portions 278.

In some embodiments, the search 730 includes performing a de-duplication operation on a subset of the identified portions, wherein each identified portion in the subset of identified portions corresponds to a same object. In some embodiments, the subset of identified portions that correspond to the same object are identified based on a proximity of locations within the floorplan associated with each identified portion in the subset of identified portions. Further, in some embodiments, the subset of identified portions that correspond to the same object are identified based on a similarity of image features between the subset of identified portions. The de-duplication operations may be performed by the de-duplication module 277.

In some embodiments, the method 700 further includes the step of refining the set of feature vectors based on the identified portions of frames in the walkthrough video. In some embodiments, the refining 740 is based on feedback indicating a relevance of one or more of the identified portions of frames of the walkthrough. For example, the feedback indicating a relevance of one or more of the identified portions of frames can be a positive vote or a negative vote received from a viewer of the identified portions of frames of the walkthrough video. In some embodiments, refining the identified set of feature vectors comprises increasing a weight associated with a feature corresponding to positive feedback and decreasing a weight associated with a feature corresponding to negative feedback. In some embodiments, the feature vectors associated with the identified portions provides information for refining the set of feature vectors associated with the search query. For example, a particular feature occurs frequently among the feature vectors associated with the identified portions, indicating the particular feature is highly predictive of the object. The set of feature vectors may be refined to increase the weight associated with the particular feature. Additionally, a particular feature occurring infrequently among the feature vectors associated with the identified portions indicates the particular feature is not predictive of the object, and the set of feature vectors may be refined to decrease the weight associated with the particular feature.

The spatial indexing system 130 receives 740 a request to search a set of walkthrough videos of the environment using the image search query, each walkthrough video associated with a timestamp. In some embodiments, the request 740 is provided by the user. In other embodiments, the request is automated by the spatial indexing system 130. In some embodiments, the set of walkthrough videos were captured over a period of time that is earlier than a time at which the walkthrough video was captured. The spatial indexing system 130 accesses the set of walkthrough videos in the walkthrough video store 141. In some embodiments, the set of walkthrough videos is the additional walkthrough videos 292.

The spatial indexing system 130 searches 750 the set of walkthrough videos to identify additional portions of frames within the set of walkthrough videos corresponding to the feature vectors. The additional identified portions are sub-frames of the set of walkthrough videos that contain instances objects or surfaces that are similar to that in the image search inquiry. The spatial indexing system 130 can search 750 for the additional identified portions by the same means as the search 730 for the identified portions, including the optional de-duplication step. The search 750 may be performed using the refined set of feature vectors associated with the image search query, as discussed above. In some embodiments, the additional identified portions are the additional identified portions 279.

The spatial indexing system 130 generates 760 an interface for display comprising a representation of a floorplan of the environment with highlighted locations corresponding to the identified portions and a histogram with a timeline indicating the additional identified portions of frames within the set of walkthrough videos. That is, the representation of the floorplan is in a first portion of the interface, and the histogram is in a second portion of the interface. The interface may be generated 760 by the search visualization interface 146.

The first portion of the generated 760 interface displays the results of the search 730. The first portion includes the representation of the floorplan of the environment with highlighted locations within the representation of the floorplan corresponding to the identified portions of frames of the walkthrough video. That is, the highlighted locations correspond to instances of objects or surfaces similar to that specified in the image search query. In some embodiments, each highlighted location within the representation of the floorplan, when selected, causes the first interface portion to be modified to provide for display an identified portion of frame from the walkthrough video that corresponds to the highlighted location.

The second portion of the generated 760 interface displays the results of the search 750. The second portion includes the histogram with the timeline corresponding to the timestamps of the set of walkthrough videos, the histogram including highlighted bars indicating instances of the identified additional portions of frames within the set of walkthrough videos. In some embodiments, each bar of the histogram represents a walkthrough video of the set of walkthrough videos captured on a particular day. In one such embodiment, the height of the highlighted bars of the histogram indicates the number of instances of additional identified portions, corresponding to instances of objects or surfaces, included within a walkthrough video captured on a particular day on the timeline. In some embodiments, each bar of the histogram, when selected, causes a floorplan corresponding to a walkthrough video captured at the timestamp associated with the selected bar to be displayed within the first interface portion.

Figure 8:
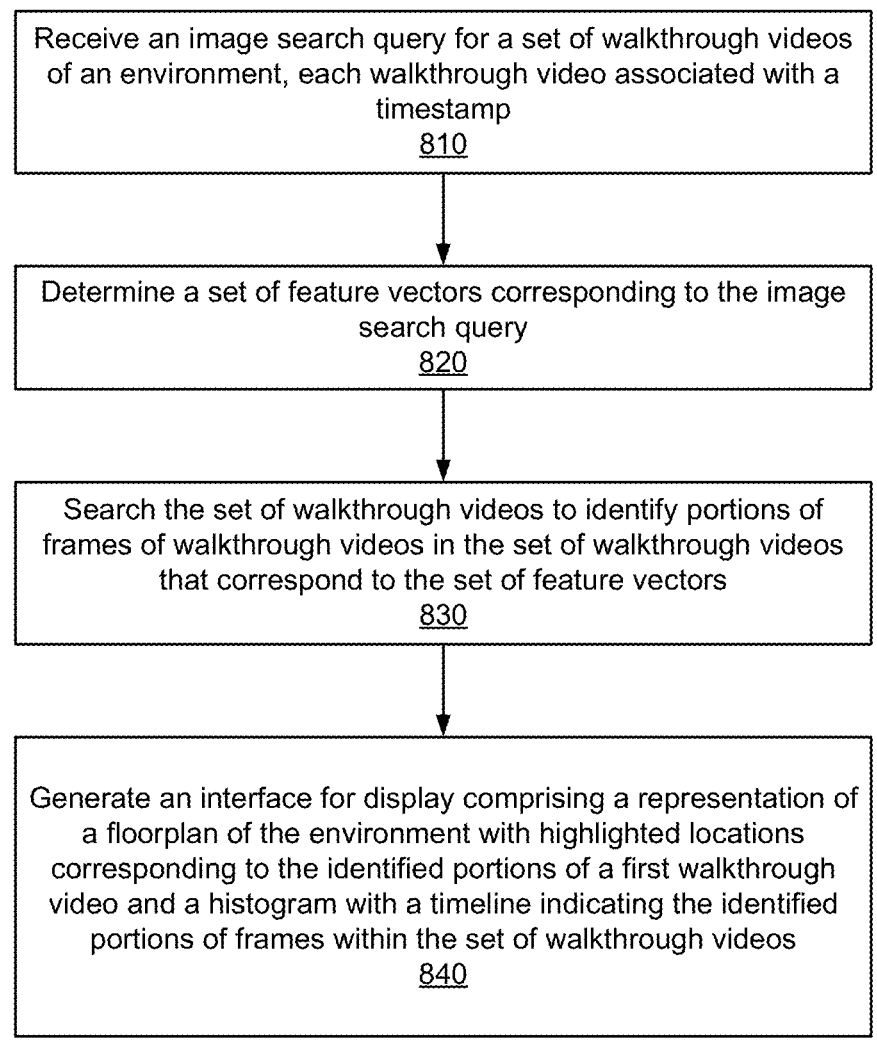
FIG. 8 is a flow chart illustrating an example method for an object search in walkthrough videos, according to one embodiment.

FIG. 8 is a flow chart illustrating an example method 800 for an object search in walkthrough videos, according to one embodiment. In other embodiments, the method 800 may include additional, fewer, or different steps, and the steps shown in FIG. 8 may be performed in a different order.

The spatial indexing system 130 receives 810 an image search query for a set of walkthrough videos of an environment, each walkthrough video associated with a timestamp. In some embodiments, the image search query includes an object or surface for the spatial indexing system 130, in particular the search module 144, to search for in the set of walkthrough videos. The image search query includes or is associated with an image of the object or surface specified in the image search query. In some embodiments, the received image search query comprises a selection of a portion of a frame of a first walkthrough video. In some embodiments, the image search query is the image search query 270 and the set of walkthrough videos is the walkthrough videos 280.

The spatial indexing system 130 determines 820 a set of feature vectors corresponding to the image in the image search query. The set of feature vectors is a n-dimensional set of vectors of numerical features that represents the image. Accordingly, the set of feature vectors also provides a representation of the object or surface in the image. In the embodiment where the received image search query comprises a selection of a portion of a frame of the first walkthrough video, the identified feature vectors are representative of image features of the selected portion of the frame of the walkthrough video. In some embodiments, the set of feature vectors is generated by the feature vector module 272.

The spatial indexing system 130 searches 830 the set of walkthrough videos to identify portions of frames of the walkthrough video that correspond to the identified set of feature vectors. The identified portions are sub-frames of the walkthrough videos in the set of walkthrough videos that contain instances objects or surfaces that are similar to that in the image search inquiry. In some embodiments, the identified portions are determined by comparing the similarity of feature vectors associated with sub-frames to the set of feature vectors associated with the image search query. In some embodiments, a difference between a feature vector corresponding to an identified portion of a frame of a walkthrough video and an identified feature vector corresponding to the image search query is less than a threshold difference. In some embodiments, the identified portions are determined by the similarity module 275 and are the identified portions 278.

In some embodiments, the search 830 includes performing a de-duplication operation on a subset of the identified portions, wherein each identified portion in the subset of identified portions corresponds to a same object. In some embodiments, the subset of identified portions that correspond to the same object are identified based on a proximity of locations within the floorplan associated with each identified portion in the subset of identified portions. Further, in some embodiments, the subset of identified portions that correspond to the same object are identified based on a similarity of image features between the subset of identified portions. The de-duplication operations may be performed by the de-duplication module 277.

In some embodiments, the method 800 further includes the step of refining the set of feature vectors based on feedback indicating a relevance of one or more of the identified portions of frames of the set of walkthrough videos. For example, the feedback indicating a relevance of one or more of the identified portions of frames can be a positive vote or a negative vote received from a viewer of the identified portions of frames of the walkthrough video. In some embodiments, refining the identified set of feature vectors comprises increasing a weight associated with a feature corresponding to positive feedback and decreasing a weight associated with a feature corresponding to negative feedback. The search 830 may be re-done after a refining step.

The spatial indexing system 130 generates 840 an interface for display comprising a representation of a floorplan of the environment with highlighted locations corresponding to the identified portions of the first walkthrough video and a histogram with a timeline indicating the identified portions of frames within the set of walkthrough videos. That is, the representation of the floorplan is in a first portion of the interface, and the histogram is in a second portion of the interface. The interface may be generated 840 by the search visualization interface 146.

The first portion of the generated 840 interface displays the results of the search 830 for a first walkthrough video. The first portion includes the representation of the floorplan of the environment with highlighted locations within the representation of the floorplan corresponding to the identified portions of frames of the first walkthrough video. That is, the highlighted locations correspond to instances of objects or surfaces similar to that specified in the image search query. In some embodiments, each highlighted location within the representation of the floorplan, when selected, causes the first interface portion to be modified to provide for display an identified portion of frame from the first walkthrough video that corresponds to the highlighted location.

The second portion of the generated 840 interface displays the results of the search 830 for the set of walkthrough videos. The second portion includes the histogram with the timeline corresponding to the timestamps of the set of walkthrough videos, the histogram including highlighted bars indicating instances of the identified portions of frames within the set of walkthrough videos. In some embodiments, each bar of the histogram represents a walkthrough video of the set of walkthrough videos captured on a particular day. In one such embodiment, the height of the highlighted bars of the histogram indicate the number of instances of identified portions, corresponding to instances of objects or surfaces, included within a walkthrough video captured on a particular day on the timeline. In some embodiments, each bar of the histogram, when selected, causes a floorplan corresponding to a walkthrough video captured at the timestamp associated with the selected bar to be displayed within the first interface portion.

XII. Hardware Components

Figure 9:
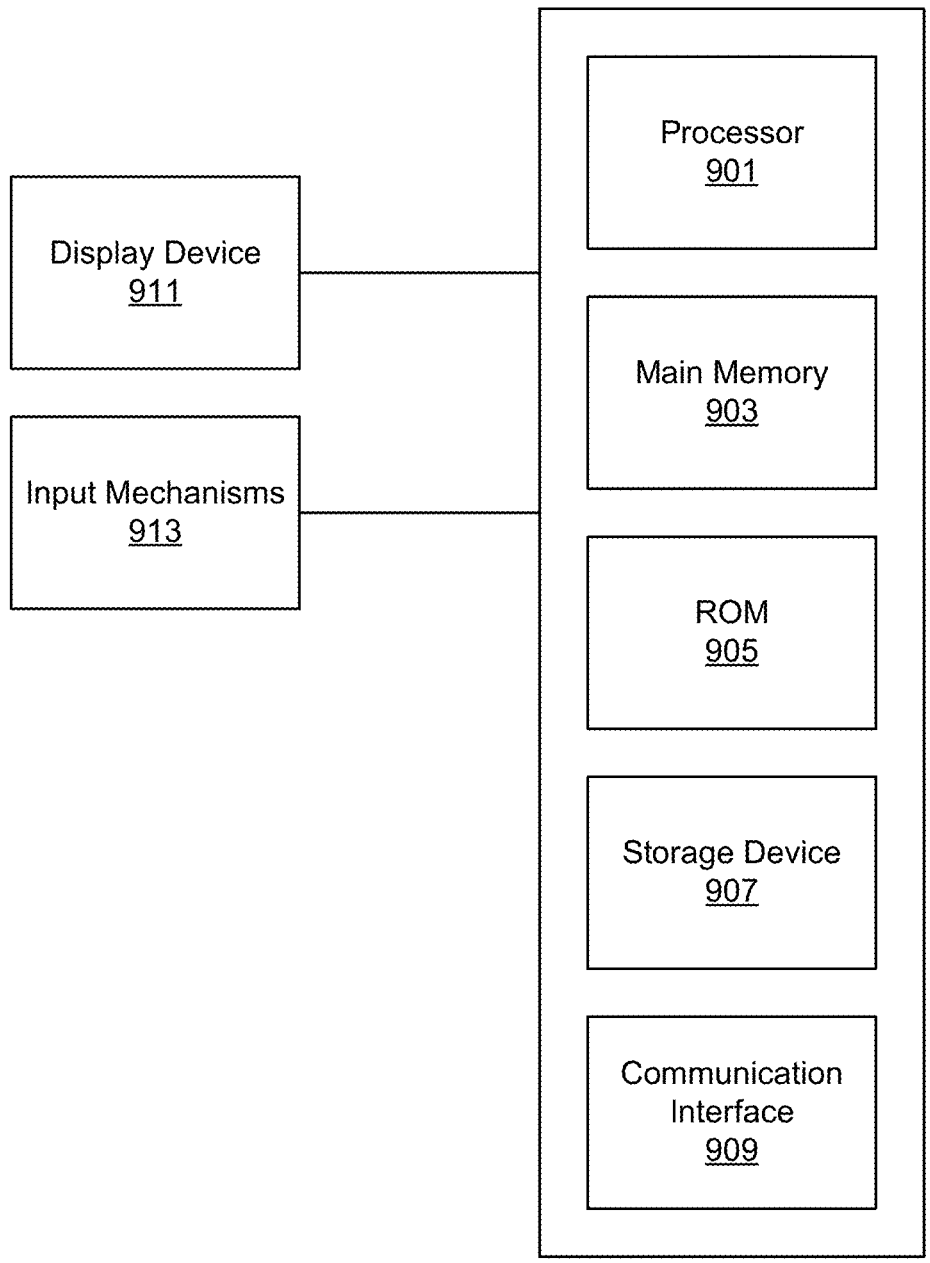
FIG. 9 is a diagram illustrating a computer system that implements the embodiments herein, according to one embodiment.

FIG. 9 is a block diagram illustrating a computer system 900 upon which embodiments described herein may be implemented. For example, in the context of FIG. 1, the video capture system 110, the spatial indexing system 130, and the client device 150 may be implemented using the computer system 900 as described in FIG. 9. The video capture system 110, the spatial indexing system 130, or the client device 150 may also be implemented using a combination of multiple computer systems 900 as described in FIG. 9. The computer system 900 may be, for example, a laptop computer, a desktop computer, a tablet computer, or a smartphone.

In one implementation, the system 900 includes processing resources 901, main memory 903, read only memory (ROM) 905, storage device 907, and a communication interface 909. The system 900 includes at least one processor 901 for processing information and a main memory 903, such as a random access memory (RAM) or other dynamic storage device, for storing information and instructions to be executed by the processor 901. Main memory 903 also may be used for storing temporary variables or other intermediate information during execution of instructions to be executed by processor 901. The system 900 may also include ROM 905 or other static storage device for storing static information and instructions for processor 901. The storage device 907, such as a magnetic disk or optical disk, is provided for storing information and instructions.

The communication interface 909 can enable system 900 to communicate with one or more networks (e.g., the network 140) through use of the network link (wireless or wireline). Using the network link, the system 900 can communicate with one or more computing devices, and one or more servers. The system 900 can also include a display device 911, such as a cathode ray tube (CRT), an LCD monitor, or a television set, for example, for displaying graphics and information to a user. An input mechanism 913, such as a keyboard that includes alphanumeric keys and other keys, can be coupled to the system 900 for communicating information and command selections to processor 901. Other non-limiting, illustrative examples of input mechanisms 913 include a mouse, a trackball, touch-sensitive screen, or cursor direction keys for communicating direction information and command selections to processor 901 and for controlling cursor movement on display device 911. Additional examples of input mechanisms 913 include a radio-frequency identification (RFID) reader, a barcode reader, a three-dimensional scanner, and a three-dimensional camera.

According to one embodiment, the techniques described herein are performed by the system 900 in response to processor 901 executing one or more sequences of one or more instructions contained in main memory 903. Such instructions may be read into main memory 903 from another machine-readable medium, such as storage device 907. Execution of the sequences of instructions contained in main memory 903 causes processor 901 to perform the process steps described herein. In alternative implementations, hard-wired circuitry may be used in place of or in combination with software instructions to implement examples described herein. Thus, the examples described are not limited to any specific combination of hardware circuitry and software.

XIII. Additional Considerations

As used herein, the term "includes" followed by one or more elements does not exclude the presence of one or more additional elements. The term "or" should be construed as a non-exclusive "or" (e.g., "A or B" may refer to "A," "B," or "A and B") rather than an exclusive "or." The articles "a" or "an" refer to one or more instances of the following element unless a single instance is clearly specified.

The drawings and written description describe example embodiments of the present disclosure and should not be construed as enumerating essential features of the present disclosure. The scope of the invention should be construed from any claims issuing in a patent containing this description.

What is claimed is:

1. A method comprising:
   receiving an image search query for a walkthrough video of an environment;
   searching the walkthrough video to identify portions of frames of the walkthrough video that correspond to the image search query;
   refining the image search query based on the identified portions of frames of the walkthrough video;
   searching a set of walkthrough videos of the environment using the refined image search query to identify additional portions of frames within the set of walkthrough videos that correspond to the refined image search query, each of the set of walkthrough videos associated with a timestamp; and
   generating an interface for display including a representation of a floorplan of the environment with marked locations within the representation of the floorplan corresponding to the identified portions of frames of the walkthrough video, and including a histogram, the independent axis of the histogram comprising a timeline corresponding to the timestamps of the set of walkthrough videos, the histogram including bars indicating instances of the identified additional portions of frames within the set of walkthrough videos.

2. The method of claim 1, wherein the received image search query comprises a selection of a portion of a frame of the walkthrough video.

3. The method of claim 1, wherein the received image search query comprises an image of an object or surface.

4. The method of claim 1, wherein the identified portions of frames of the walkthrough video are within a threshold measure of similarity to a set of feature vectors.

5. The method of claim 4, wherein a difference between a feature vector corresponding to an identified portion of a frame of the walkthrough video and an identified feature vector corresponding to the image search query is less than a threshold difference.

6. The method of claim 4, wherein the set of feature vectors is refined based on the identified portions of frames of the walkthrough video and based on feedback indicating a relevance of one or more of the identified portions of frames of the walkthrough.

7. The method of claim 6, wherein the feedback indicating a relevance of one or more of the identified portions of frames comprises a positive vote or a negative vote received from a viewer of the identified portions of frames of the walkthrough video.

8. The method of claim 6, wherein refining the identified set of feature vectors comprises increasing a weight associated with a feature corresponding to positive feedback and decreasing a weight associated with a feature corresponding to negative feedback.

9. The method of claim 1, wherein the set of walkthrough videos were captured over a period of time that is earlier than a time at which the walkthrough video was captured.

10. The method of claim 1, wherein the image search query corresponds to an object, and wherein the marked locations within the representation of the floorplan comprises marking locations of the object within the floorplan based on the representation of the object within the walkthrough video.

11. The method of claim 1, wherein each marked location within the representation of the floorplan, when selected, causes the interface to be modified to provide for display an identified portion of frame from the walkthrough video that corresponds to the marked location.

12. The method of claim 1, wherein each bar of the histogram corresponds to a walkthrough video of the set of walkthrough videos captured on a particular day.

13. The method of claim 12, wherein a height of each bar of the histogram is based on a number of identified portions of frames included within the walkthrough video captured on the particular day corresponding to the bar of the histogram.

14. The method of claim 1, wherein each bar of the histogram, when selected, causes a floorplan corresponding to a walkthrough video captured at the timestamp associated with the selected bar to be displayed within the first interface portion.

15. The method of claim 1, wherein searching the walkthrough video further comprising performing a de-duplication operation on a subset of identified portions of frames within the walkthrough video, wherein each identified portion in the subset of identified portions corresponds to a same object.

16. The method of claim 15, wherein the subset of identified portions of frames of the walkthrough video that correspond to the same object are identified based on a proximity of locations within the floorplan associated with each identified portion in the subset of identified portions of frames of the walkthrough video.

17. The method of claim 15, wherein the subset of identified portions of frames of the walkthrough video that correspond to the same object are identified based on image features between the subset of identified portions of frames of the walkthrough video.

18. The method of claim 1, wherein then environment includes multiple floors, the floorplan spans the multiple floors, and wherein the first interface portion includes a scrollable representation of the multiple floors such that a viewer can scroll to view marked locations corresponding to the identified portions of frames across multiple floors.

19. A system comprising:
a hardware processor; and
a non-transitory computer-readable storage medium storing executable instructions that, when executed by the hardware processor, cause the hardware processor to perform steps comprising:
receiving an image search query for a walkthrough video of an environment;
searching the walkthrough video to identify portions of frames of the walkthrough video that correspond to the image search query;
refining the image search query based on the identified portions of frames of the walkthrough video;
searching a set of walkthrough videos of the environment using the refined image search query to identify additional portions of frames within the set of walkthrough videos that correspond to the refined image search query, each of the set of walkthrough videos associated with a timestamp; and
generating an interface for display including a representation of a floorplan of the environment with marked locations within the representation of the floorplan corresponding to the identified portions of frames of the walkthrough video, and including a histogram, the independent axis of the histogram comprising a timeline corresponding to the timestamps of the set of walkthrough videos, the histogram including bars indicating instances of the identified additional portions of frames within the set of walkthrough videos.

20. A non-transitory computer-readable storage medium storing executable instructions that, when executed by a hardware processor, cause the hardware processor to perform steps comprising:
receiving an image search query for a walkthrough video of an environment;
searching the walkthrough video to identify portions of frames of the walkthrough video that correspond to the image search query;
refining the image search query based on the identified portions of frames of the walkthrough video;
searching a set of walkthrough videos of the environment using the refined image search query to identify additional portions of frames within the set of walkthrough videos that correspond to the refined image search query, each of the set of walkthrough videos associated with a timestamp; and
generating an interface for display including a representation of a floorplan of the environment with marked locations within the representation of the floorplan corresponding to the identified portions of frames of the walkthrough video, and including a histogram, the independent axis of the histogram comprising a timeline corresponding to the timestamps of the set of walkthrough videos, the histogram including bars indicating instances of the identified additional portions of frames within the set of walkthrough videos.

* * * * *